(12) United States Patent
Dhand et al.

(10) Patent No.: US 9,714,045 B2
(45) Date of Patent: Jul. 25, 2017

(54) FOLDABLE SHOPPING CART

(71) Applicant: Arti Dhand, Toronto (CA)

(72) Inventors: Arti Dhand, Toronto (CA); Scott Grant, Toronto (CA); Morna Gamblin, Toronto (CA)

(73) Assignee: Arti Dhand, Toronto (CA)

( * ) Notice: Subject to any disclaimer, the term of this patent is extended or adjusted under 35 U.S.C. 154(b) by 0 days.

(21) Appl. No.: 14/910,770

(22) PCT Filed: Feb. 6, 2014

(86) PCT No.: PCT/CA2014/050072
§ 371 (c)(1),
(2) Date: Feb. 8, 2016

(87) PCT Pub. No.: WO2015/021537
PCT Pub. Date: Feb. 19, 2015

(65) Prior Publication Data
US 2016/0200339 A1 Jul. 14, 2016

Related U.S. Application Data

(60) Provisional application No. 61/864,605, filed on Aug. 11, 2013.

(51) Int. Cl.
*B62B 1/12* (2006.01)
*B62B 3/02* (2006.01)
(Continued)

(52) U.S. Cl.
CPC .............. *B62B 3/027* (2013.01); *B62B 1/12* (2013.01); *B62B 1/142* (2013.01); *B62B 1/266* (2013.01);
(Continued)

(58) Field of Classification Search
None
See application file for complete search history.

(56) References Cited

U.S. PATENT DOCUMENTS 2,196,914 A   4/1940  Goldman
2,429,034 A   10/1947 Smith et al.
(Continued)

FOREIGN PATENT DOCUMENTS

CN  201566662  9/2010
CN  102079322  6/2011
(Continued)

OTHER PUBLICATIONS

Canadian Intellectual Property Office, "International Search Report and Written Opinion" dated Apr. 24, 2014 for the corresponding PCT Patent Application No. PCT/CA2014/050072.
(Continued)

*Primary Examiner* — Jacob Knutson
*Assistant Examiner* — Hilary L Johns

(57) ABSTRACT

A foldable cart for holding a plurality of baskets. Each basket has collapsible sidewalls and an upper-frame secured to and surrounding an upper rim of the collapsible sidewalls. The cart has shelf-supports, each shelf-support supporting at least one basket. First and second arms are each pivotally coupled to a side of each of the plurality of shelf-supports, the sides being opposite one another. Basket-retainers for removably receiving a basket are provided, each basket-retainer pivotally coupled to the first arm at a first side thereof and to the second arm at a second side thereof, the first and second sides being opposite one another. Each basket-retainer is pivotally coupled above each shelf-support to secure the upper-frame of one basket above the shelf-support. Also provided is cart handle coupled to an
(Continued)

upper-end of both the first and second arms, and a leg pivotally coupled to each of the first and second arms.

20 Claims, 22 Drawing Sheets

(51) Int. Cl.
*B62B 5/06* (2006.01)
*B62B 1/14* (2006.01)
*B62B 1/26* (2006.01)
*B62B 3/10* (2006.01)
*B62B 5/00* (2006.01)

(52) U.S. Cl.
CPC .............. *B62B 3/106* (2013.01); *B62B 5/06* (2013.01); *B62B 5/0013* (2013.01); *B62B 5/064* (2013.01); *B62B 2202/26* (2013.01); *B62B 2203/02* (2013.01); *B62B 2205/06* (2013.01)

(56) References Cited

U.S. PATENT DOCUMENTS

| | | | | |
|---|---|---|---|---|
| 5,464,104 A * | 11/1995 | McArthur | ............ | A47F 5/0025 211/133.3 |
| 6,152,340 A | 11/2000 | Chen et al. | | |
| 7,168,715 B1 * | 1/2007 | Friedman | ................ | B62B 3/006 280/33.991 |
| 7,703,776 B1 * | 4/2010 | Nugent | .................... | B62B 1/22 280/47.18 |
| 8,550,474 B2 * | 10/2013 | Geva | ....................... | B62B 3/027 280/35 |
| 2010/0052276 A1 * | 3/2010 | Brunner | ................ | B25H 3/027 280/47.35 |
| 2012/0074664 A1 | 3/2012 | Henny et al. | | |

FOREIGN PATENT DOCUMENTS

| | | | |
|---|---|---|---|
| CN | 102133900 | | 7/2011 |
| CN | 202283927 | | 6/2012 |
| CN | 202283927 U | * | 6/2012 |
| CN | 202481105 | | 10/2012 |
| EP | 2578468 | | 4/2013 |
| FR | 2618400 | | 1/1989 |
| GB | 2111917 | | 7/1983 |
| JP | 2000302044 | | 10/2000 |
| JP | 2001122125 | | 5/2001 |
| JP | 2005047417 | | 2/2005 |
| JP | 2010047159 | | 3/2010 |
| KR | 1020090109526 | | 10/2009 |

OTHER PUBLICATIONS

European Search Report (EP14836921) dated Mar. 16, 2017.

* cited by examiner

FOLDABLE SHOPPING CART

CROSS-REFERENCE TO RELATED APPLICATIONS

This Application claims priority from U.S. Provisional Application No. 61/864,605 filed Aug. 11, 2013, the contents of which are herein incorporated by reference.

FIELD

This disclosure relates to a cart, particularly, a foldable shopping cart configured to fold with one or more baskets.

BACKGROUND

Personal shopping carts have become ubiquitous in Western societies, particularly in urban centers where people live in condominiums and apartment buildings and walk to the local grocery store rather than drive. Carts are of great use in a variety of situations, particularly when transporting heavy objects or multiple small goods. The cart serves the needs of pedestrian shoppers, who walk to and from the grocery store, or who take public transportation.

In a typical embodiment, a cart has wheels and a basket or shelf for holding objects for transportation. The cart allows the user to keep their hands free when not interacting with the cart. Additionally, some carts are configured to carry heavy loads that the user may not be able to lift for a long time. In some situations, a shopper uses a personal cart to carry objects to and from a car, and then store the cart in the car. In other situations, a shopper uses a personal cart to carry objects to and from their house. However, carts are usually large and bulky; thus difficult to store and carry. It is thus desirable that the cart fit inside the trunk of a car or a small storage closet.

Additional difficulties with existing carts may be appreciated in view of the detailed description of example embodiments below.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF EXAMPLE EMBODIMENTS

Figure 1:
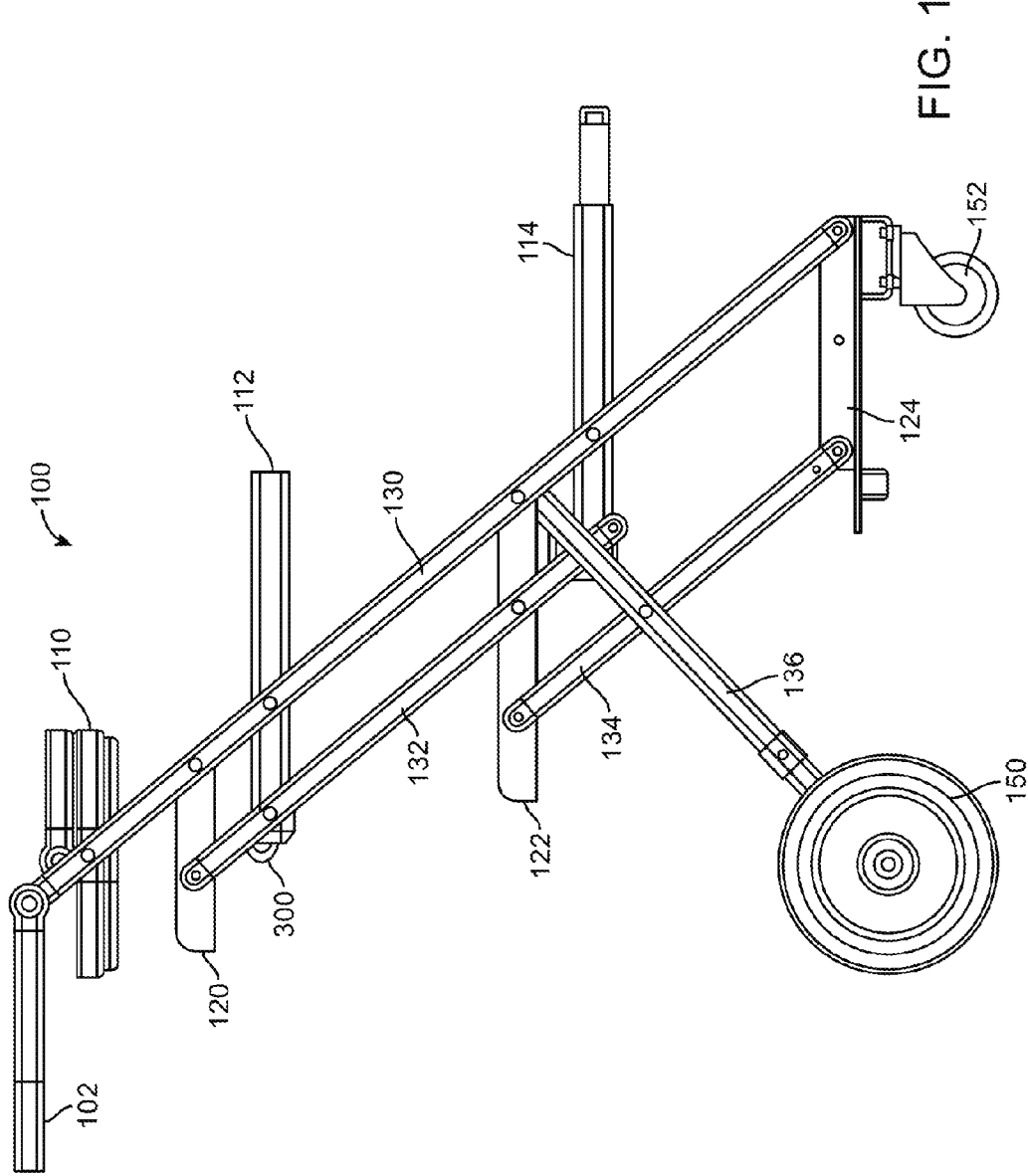
FIG. 1 shows a side profile view of an example embodiment of a cart.

A foldable shopping cart configured to removably hold a basket having collapsible sidewalls is disclosed. The foldable cart is configured to fold, for example, for storage. The collapsible sidewalls baskets may collapse when the cart is folded, thereby allowing the baskets to remain attached to cart when folded. However, the baskets may be removed prior to folding. The configuration of the cart thus is adaptable for specific use cases. For example, the baskets may be configured by the user of the cart in dependence on the items the user wishes to transport in the cart. In one embodiment, different baskets are used to separate different types of items; for example, isolating fragile items such as eggs. For example, if one basket contains objects, the basket may be removed from the cart, and stored separately, prior to folding the cart. Thus, the objects in the basket may remain in the basket whilst the cart is folded. In other examples, the basket may remain attached to cart, even if some objects are in the basket, while the cart is folded. This may be useful if the basket is not filled; thus the collapsed basket is sufficient to enclose the objects. The use of baskets evidently helps reduce the use of shopping bags, which have a negative environmental impact.

A foldable cart for holding a basket is disclosed. In one aspect of this disclosure, the basket has collapsible sidewalls and an upper-frame secured to and surrounding an upper-rim of the collapsible sidewalls. The foldable cart has a first arm and an opposing parallel second arm which are angled when the foldable cart is in an open configuration; a shelf-support pivotally coupled at opposing sides to the first and second arms for supporting a bottom of the basket; a basket-retainer for removably receiving the upper-frame of the basket above the shelf-support, the basket-retainer pivotally coupled at opposing sides to the first and second arms; a respective leg operably coupled to each of the first and second arms; and a respective wheel mounted to each leg.

In one aspect of the disclosure, the upper-frame of the basket is securable to the basket-retainer by a releasable locking-mechanism, such as a cam latch. The basket may be movable between first and second positions along the basket-retainer when the locking-mechanism is released. In one aspect of the disclosure, the basket slides between the first and second positions along the basket-retainer when the locking-mechanism is released, and the basket may be removable from the cart when moved beyond the second position.

In one aspect of the disclosure, the upper-frame of the basket has a rounded-rectangular shape.

In one aspect of the disclosure, the shelf-support is rotatable about a pivot point.

In one aspect of the disclosure, the shelf-support is positioned at an end of the first and second arms opposite the handle, the cart further comprising first and second casters each mounted at a side of the bottom of the shelf-support, the sides being opposite one another.

In one aspect of the disclosure, the foldable cart includes a cart-handle coupled to an upper-end of both the first and second arms.

A foldable cart for holding a plurality of baskets is disclosed. In one aspect of the disclosure, each basket has collapsible sidewalls and an upper-frame secured to and surrounding an upper rim of the collapsible sidewalls. The foldable cart includes a first arm and an opposing parallel second arm which are angled when the foldable cart is in an open configuration; a plurality of shelf-supports each pivotally coupled at opposing sides to the first and second arms for supporting a bottom of one of the baskets; a plurality of basket-retainers each for removably receiving the upper-frame of one of the baskets, each basket-retainer pivotally coupled at opposing sides to the first and second arms; a respective cart handle coupled to an upper-end of both the first and second arms; a respective leg operably coupled to each of the first and second arms; and a respective wheel mounted to each leg.

In one aspect of the disclosure, the foldable cart includes first and second struts each pivotally coupled to a side of one of the plurality of shelf-supports, the sides being opposite one another, wherein the first strut is substantially parallel to the first arm and the second strut is substantially parallel to the second arm. Each of the first and second struts may be pivotally coupled to one of the legs. The foldable cart may also include a cross-strut secured to both legs.

In one aspect of the disclosure, the arms and struts are pivotally coupled to the support-shelves at a 30 to 60 degree angle and wherein the legs are substantially perpendicular to the arms. In one aspect of the disclosure, each of the plurality of shelf-supports recedes relative to one another.

In one aspect of the disclosure, moving the legs towards the support shelf causes the support-shelves to pivot about a pivot point in the arms, thereby causing the arms and legs be substantially parallel to one another.

In one aspect of the disclosure, the upper-frame of each basket is securable to one of the basket-retainers by a releasable locking mechanism. In one aspect of the disclosure, the releasable locking mechanism includes a latch, and a receptacle. The receptacle has an aperture configured to receive the latch when the locking mechanism is in an open position, and further configured to lock the latch when the locking mechanism is in a closed position. Each basket includes a handle, the handle having an end rotatably secured to the receptacle and configured to rotate the locking mechanism when rotated.

In one aspect of the disclosure, the cart includes a cover mechanism that can be stored inside a compartment at the handle.

In another aspect of the disclosure, the cart includes a handle attached to the cart. The handle allows a user to fold and unfold the cart by applying a force unto the handle.

A method for folding a foldable cart is disclosed. In one aspect of the disclosure, the foldable cart has a leg, the leg perpendicularly and pivotally coupled to a lower-strut, the lower-strut pivotally coupled to middle- and lower-level support-shelves, the middle-level support-shelf being pivotally coupled to an upper-strut, the upper-strut being pivotally coupled to an upper-level support-shelf, and wherein the upper-, middle- and lower-level support shelves are pivotally coupled to an arm, the arm being parallel to both lower- and upper-struts. In one aspect of the disclosure, folding the cart includes applying a force to the leg in a first direction, thereby causing the leg and the lower-strut to move in the first direction and the upper-strut to move in a second direction, the second direction opposing the first direction, and further causing the upper-, middle- and lower-level support shelves to rotate in the second direction, thereby folding the foldable cart.

Figure 16:
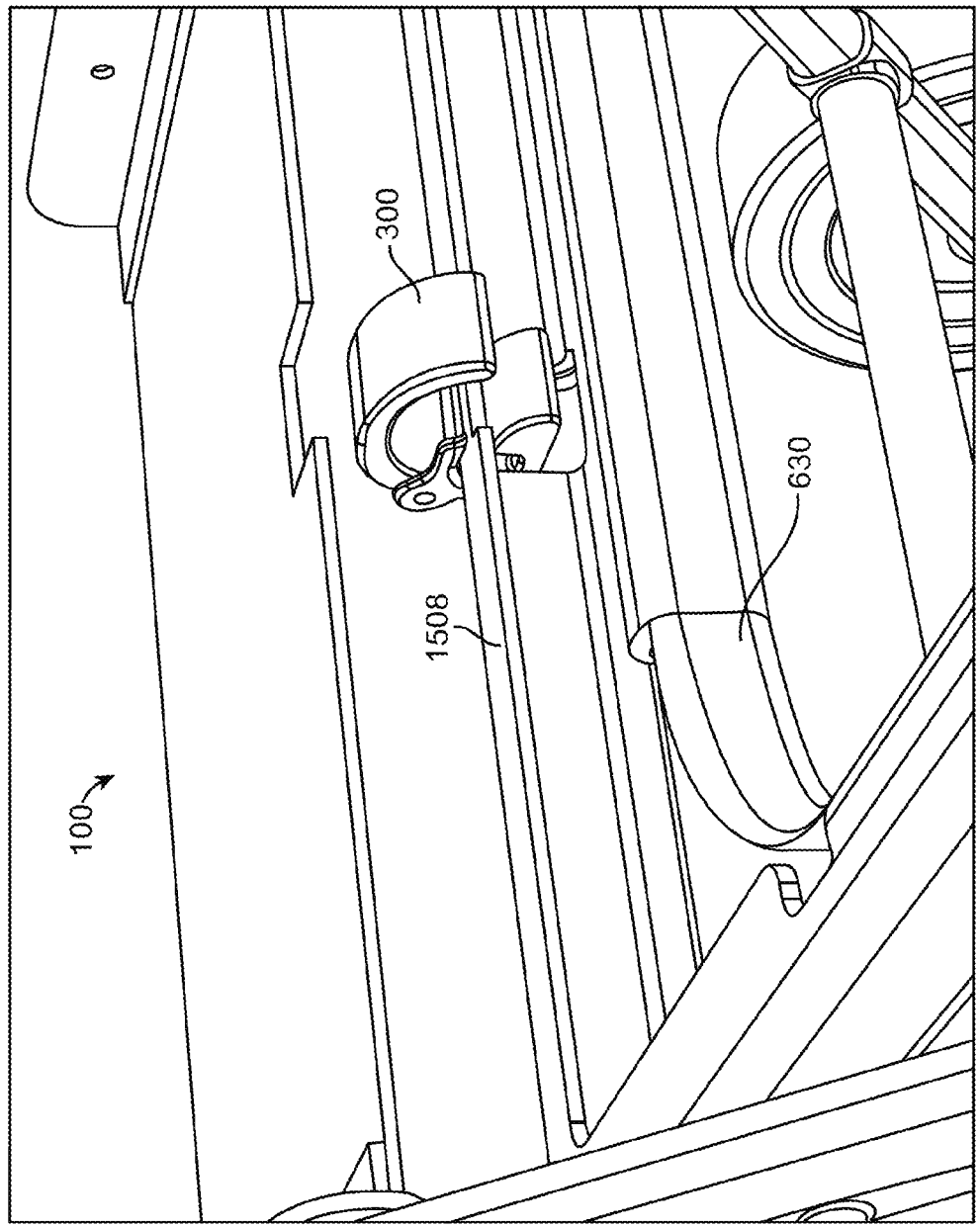
FIG. 16 shows a top perspective view of an example basket locking mechanism in an unlocked position for use with the cart of FIG. 1.
Figure 17:
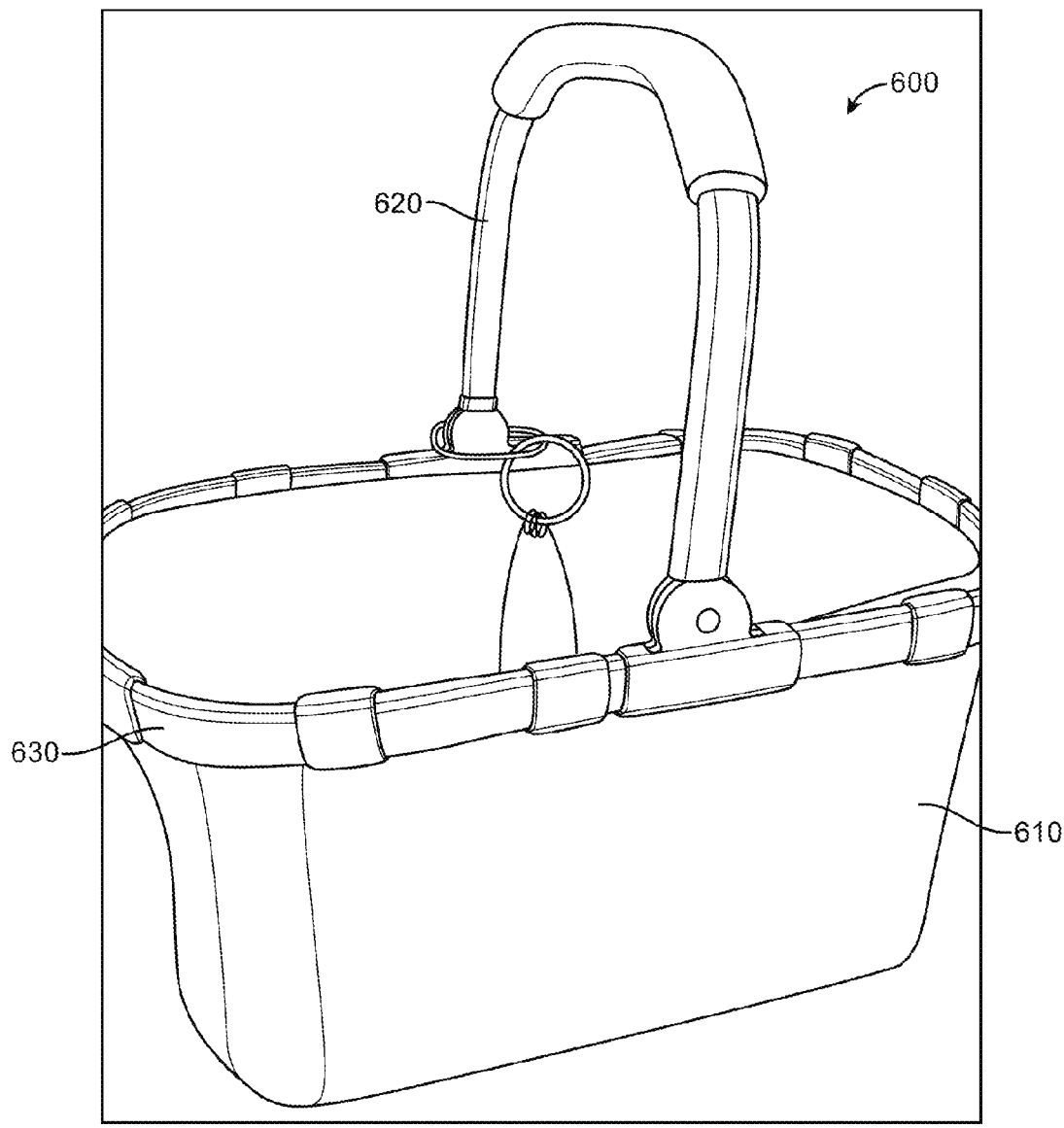
FIG. 17 shows a top perspective view of an example basket in a fully extended state for use with the cart of FIG. 1.
Figure 18:
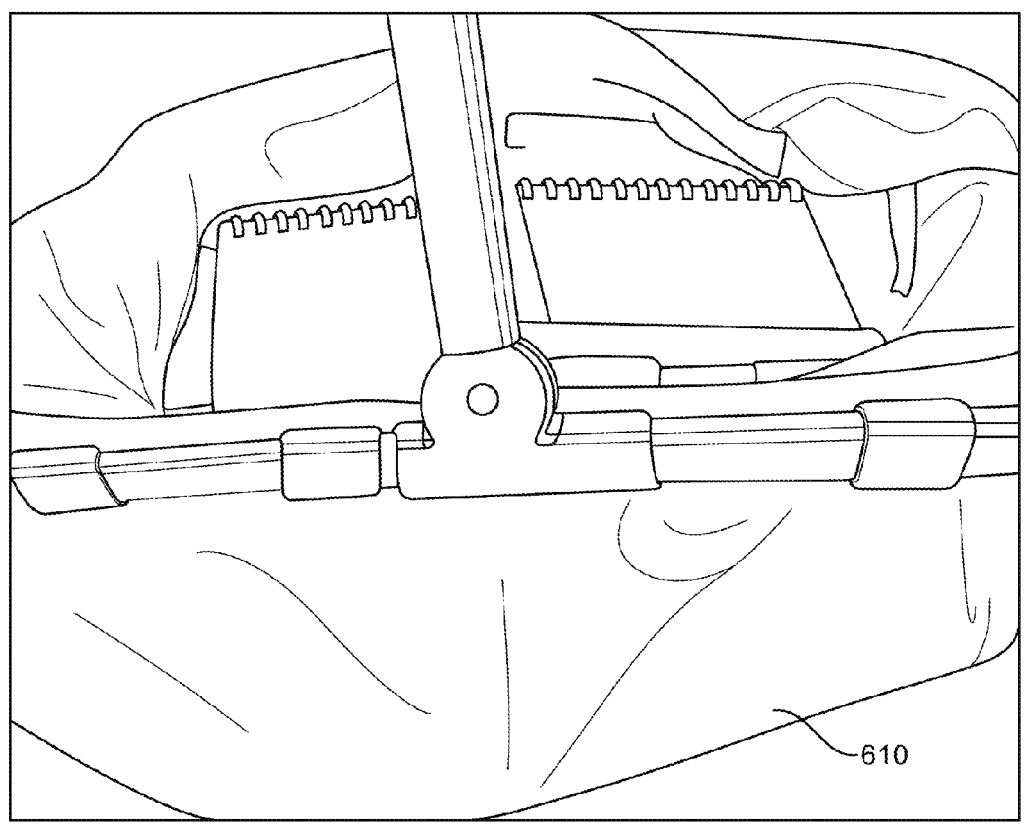
FIG. 18 shows a top perspective view of an example basket in a state position for use with the cart of FIG. 1.

Reference is first made to FIGS. 17 and 18, illustrating an example embodiment of a basket 600 configured for use with a foldable cart 100 of FIGS. 1 to 16. The basket 600 has an upper-frame 630 secured to and surrounding an upper-rim of collapsible sidewalls 610. The upper-frame 630 has a rounded-rectangular shape. The rounded-rectangular shape allows the upper-frame 630 to be more easily receivable by the cart 100, as explained in greater detail herein; however, in other embodiments, other shapes are possible. The upper-frame 630 is rigid, and is in some embodiments made up of formed aluminum or plastic. The collapsible sidewalls 610, on the other hand, are made up of a flexible material, such as canvas, mesh, or fabric in some embodiments; accordingly, the upper-frame 630 shapes the sidewalls 610 in correspondence with the shape of the upper-frame 630. The base of the basket 600 (not shown) is also made up of a flexible material, such as canvas, mesh, or fabric in some embodiments. In some example embodiments, the collapsible sidewalls 610 can also provide a visual surface for various colors, ornamentations, textures, designs, logos to be customized.

Pivotally coupled to the upper-frame 630, for example by a pivot-hinge or other coupling means, is a handle 620 for carrying the basket 600. The handle 620 is rigid and U-shaped in some embodiments, and is made up of formed aluminum or plastic. Additionally when aluminum or other metals are used, a portion of the handle 620 may also be covered with a plastic layer; as metals may react with a user's hand.

The basket 600 is shown in an extended state in FIG. 17, and in a collapsed state in FIG. 18. As the sidewalls 610 are made up of a flexible material, the sidewalls 610 are deformable. In the collapsed state, the basket 600 occupies a smaller volume; thus is useful for use with the foldable cart 100. The sidewalls 610 may further be folded-up to fit inside the area of the upper-frame 630, in some embodiments. Additionally, when the basket 600 is received in the cart 100, while the cart is in an assembled, non-folded configuration, the basket 600 becomes extended due to the force of gravity acting on the basket 600, as will be illustrated.

Reference is made to FIGS. 1 and 9 to 16, showing several views of a foldable cart 100 configured to hold, for example, up to three baskets 600. In some embodiments, the foldable cart is adapted to hold one basket only (not shown). In other embodiments, the foldable cart is adapted to hold a plurality of baskets. However, a person skilled in the art may adapt the cart, as disclosed, to hold any number of baskets.

Figure 9:
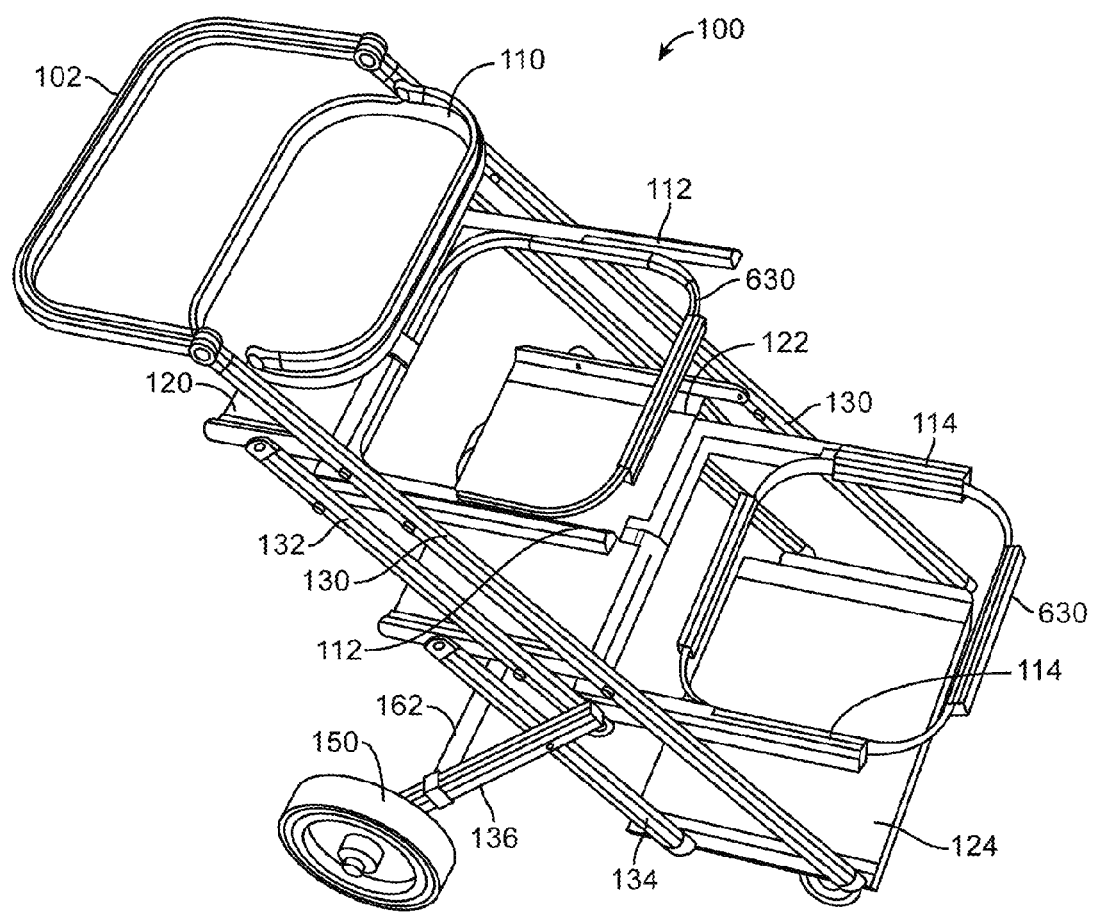
FIG. 9 shows a top perspective view of the cart of FIG. 1.

The cart 100 includes a shelf-support for each basket 600. As shown in FIG. 9, each shelf-support 120, 122, and 124 is substantially rectangular in shape, and is positioned such that the base of a basket 600 rests upon the shelf-support when the basket 600 is secured to the cart 100. The shelf-supports may be made up of any one of formed sheet aluminum, perforated plastic, and solid plastic, without limitations. Each shelf-support may be sized appropriately in correspondence with the size of the basket 600 the shelf supports. In some embodiments, the shelf-supports are made up of varying sizes, each supporting a different sized basket 600, while in other embodiments, the shelf-supports are made up of one size.

The cart 100 also includes a basket-retainer for each basket 600 for receiving an upper frame 630 of the basket 600. With reference to FIG. 9, example basket-retainers are shown, including an upper-level basket-retainer 110, a middle-level basket-retainer 112, and a lower-level basket-retainer 114.

Figure 15:
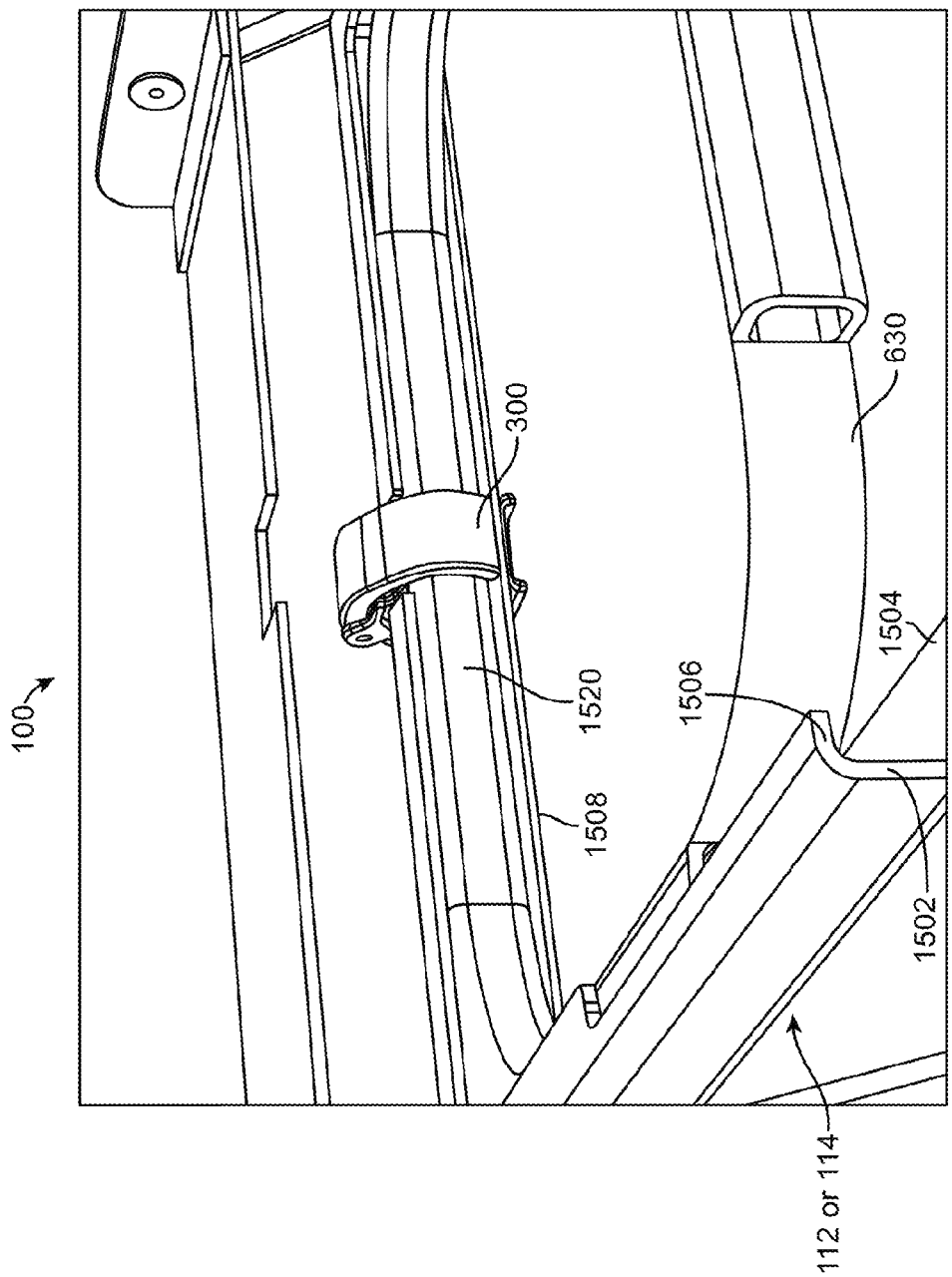
FIG. 15 shows a top perspective view of an example basket locking mechanism in a locked position for use with the cart of FIG. 1.

In one embodiment, middle- and upper-level basket-retainers 112, and 114 are made up of two opposing, elongate-rods. One example embodiment of one of the elongate-rods is best shown in FIG. 15. Each of the two elongate-rods 1502 of the basket-retainer has a lower-support-member 1504, having a flat elongate-shelf surface fixed perpendicularly to the lower side of elongate-rod 1502 and along the longitudinal axis of the elongate-rod 1502; thus creating an L-shaped member. In some embodiments, each of the two elongate-rods of the basket-retainer also has an upper-support-member 1506, similar in structure to the lower-support-member, but instead fixed perpendicularly to the upper side of the elongate-rod 1502 and along the longitudinal axis of the elongate-rod 1502. The upper-support-member 1506 may be tapered-off at some portions to allow the L-shaped members to receive the upper-frame 630 of the basket 600. Additionally, the L-shaped members have an open end for removably receiving the upper-frame 630 of the basket 600. The L-shaped members may additionally be fixed in a parallel position to one another by a perpendicular-elongate-rod 1508 secured to one end of each of the parallel elongate-rods 1502. The perpendicular-elongate-rod 1508 may also have attached to upper and lower sides thereof lower and upper support-members, respectively, similarly to the parallel elongate-rods 1502. The parallel- and perpendicular-elongate-rods may be made up of formed aluminum or plastic, for example and without limitation.

Figure 13:
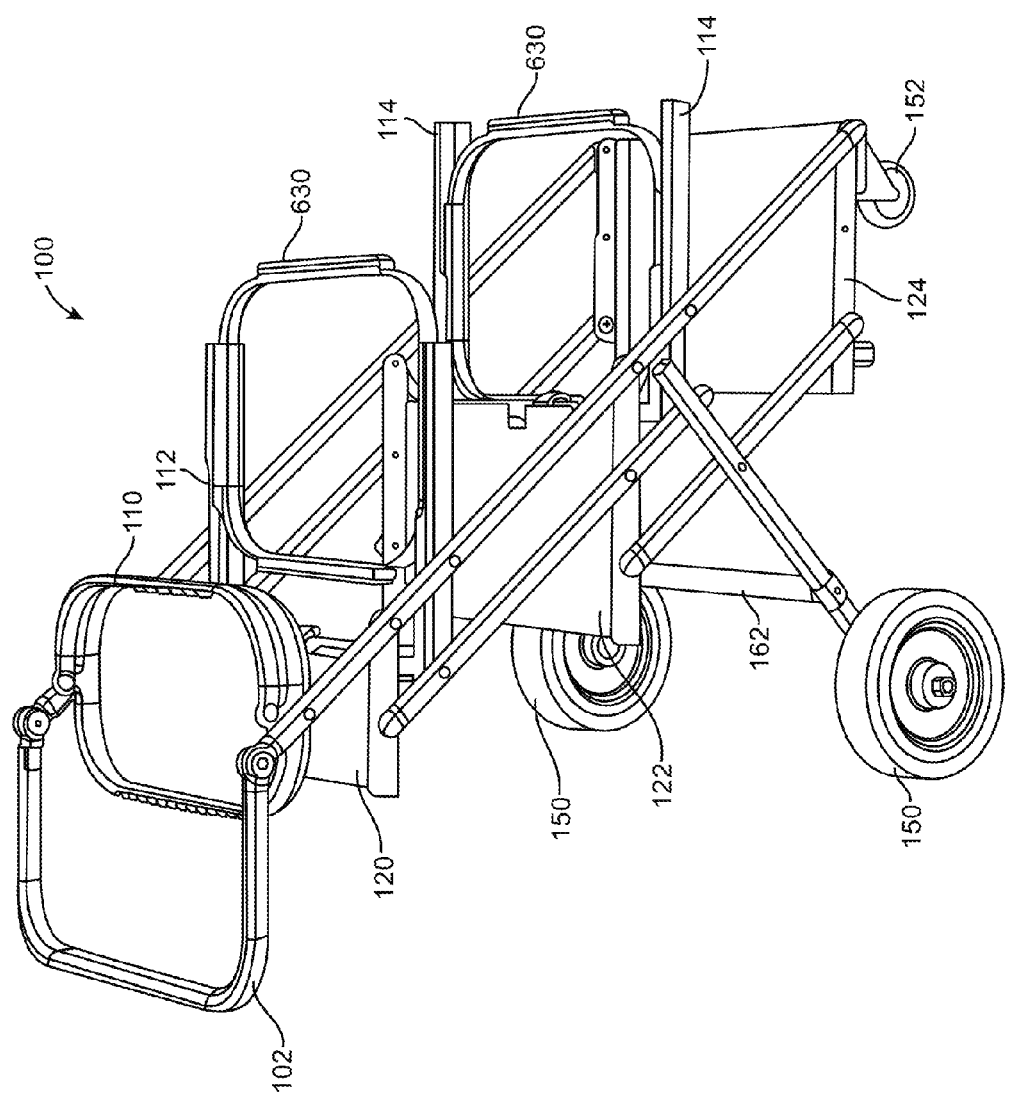
FIG. 13 shows a top perspective view of the cart of FIG. 1.
Figure 14:
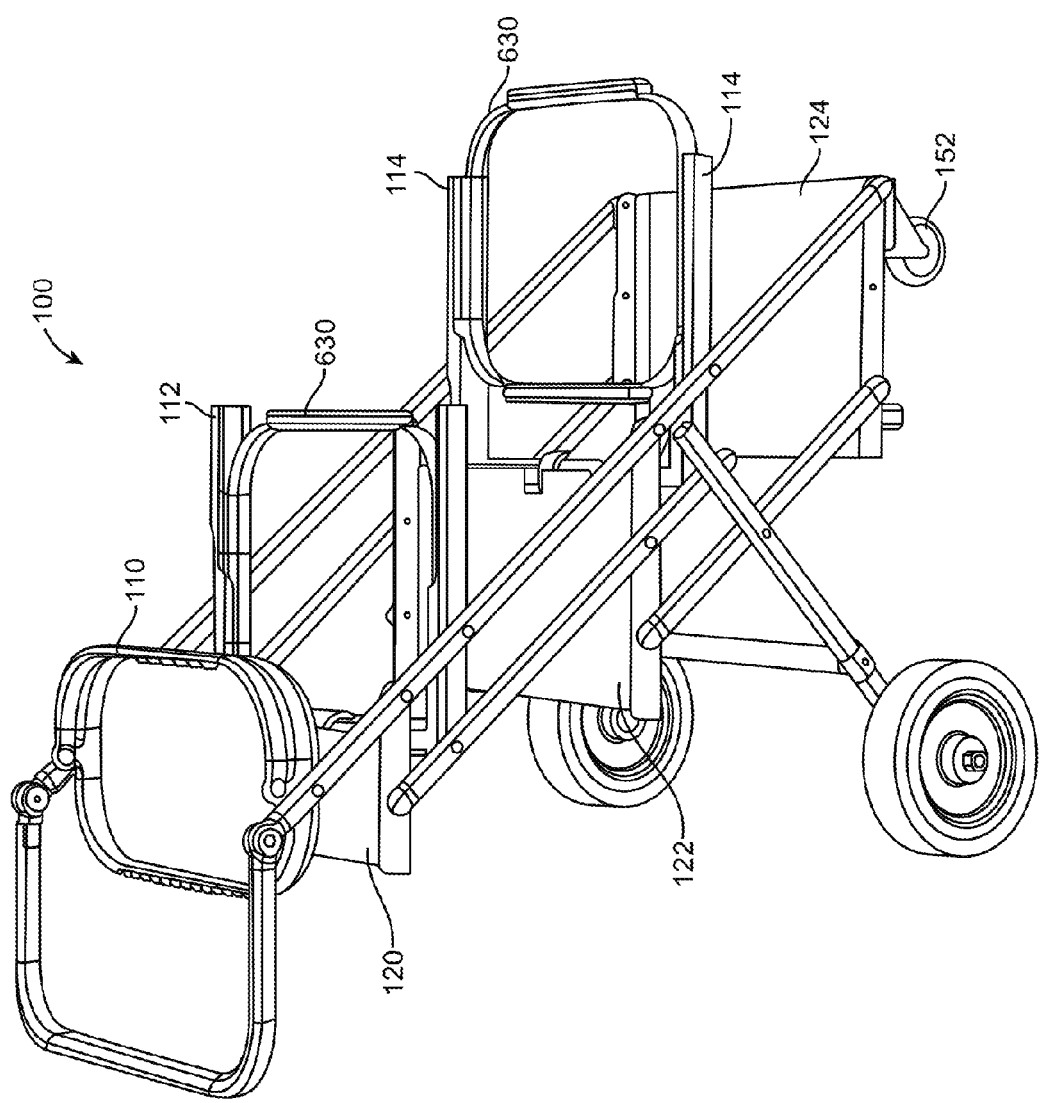
FIG. 14 shows a top perspective view of the cart of FIG. 1.

Each basket 600 is configured to fit within one of the basket-retainers 112 or 114, for example, by varying the width and/or length of the upper-frame 630 of the basket 600 to match the distance between the parallel elongate-rods 1502. The upper-frame 630 is received between the parallel elongate-rods 1502, and slid along the parallel elongate-rods 1502 until the inner-side of upper-frame 630 reaches the perpendicular-elongate-rod 1508. Accordingly, it may be appreciated that the rounded-edges of the upper-frame 630, due to the rounded-rectangular shape, allow for easier entry of the upper-frame 630 into the L-shaped members of the basket-retainer 112 or 114. Once received in the basket-retainer 112 or 114, the basket 600 may slide between a first-position, where the inner-side of the upper-frame 630 reaches the perpendicular-elongate-rod 1508 and an extended-position, while still remaining in the basket-retainer 112 or 114. The upper-support-member 1506 thus helps to counter-balance the weight of the basket 600 when the basket 600 is in the extended-position; as the basket 600 may tilt downwardly due to the force of gravity. The upper-support-member 1506 thus secures the basket 600 from falling when in the extended-position. It may be appreciated that when in the extended-position, a user may have enhanced access to the basket 600 and the contents of the basket 600. Additionally, the basket 600 is freed from the basket-retainer 112 or 114 simply by moving the basket 600 beyond the extended-position. FIG. 13 illustrates the extended-position of a basket 600 in the middle-level basket-retainer 112, and FIG. 14 illustrates the extended-position of a basket 600 in the lower-level basket-retainer 114 (only the upper-frame 630 of the basket 600 is shown for better clarity).

It may be appreciated that while in use, movement of the basket 600, for example, due to vibrations of the cart, within the basket-retainer 112 or 114 may be undesirable. To help prevent such movement, and accidental removal of the basket 600, a releasable locking-mechanism 300 is provided. An example locking-mechanism 300 is shown in a locked-position FIG. 15, and in a released-position in FIG. 16. The locking-mechanism is secured to the perpendicular-elongate-rod 1508 and locks the upper-frame 630 in the first-position, where the inner-side of the upper-frame 630 reaches the perpendicular-elongate-rod 1508. The locking-mechanism 300 may be any type of latch, such as a cam latch made of a formed plastic construction, as shown in FIG. 15. The latch engulfs both the perpendicular-elongate-rod 1508 and the inner-side of the upper-frame 630; thereby securing the two together. When in the released-position, as shown in FIG. 16, the latch is moved such that inner-side of the upper-frame 630 may pass through a gap-portion of the latch; thereby releasing the upper-frame 630 and allowing the basket 600 to slide within the basket-retainer 112 or 114. In FIG. 16, the upper-frame 630 basket is shown to be in an extended-position.

Figure 20:
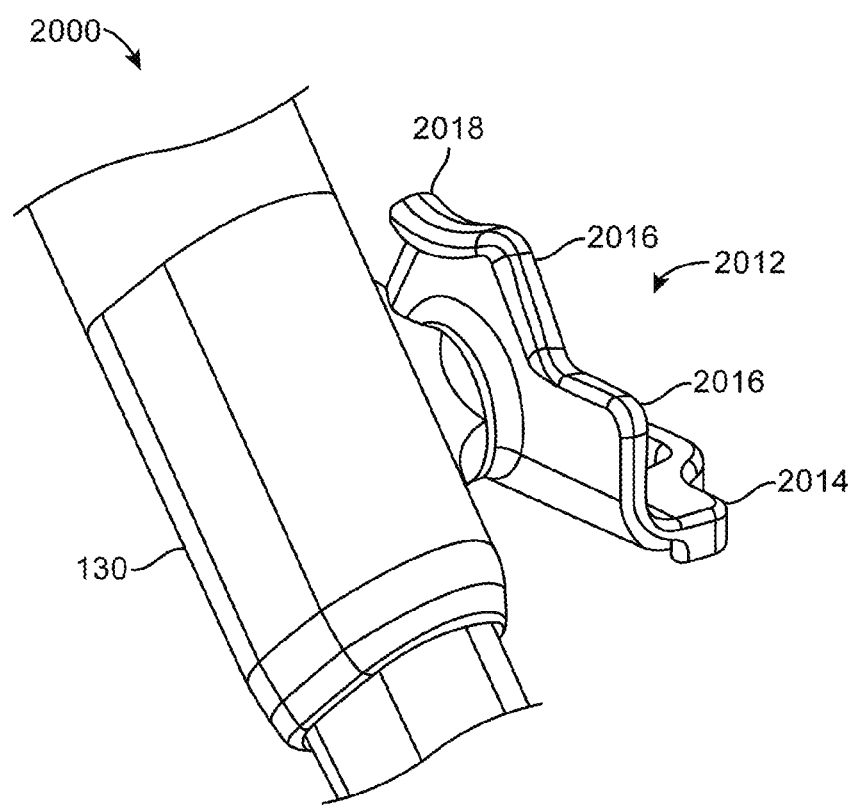
FIG. 20 shows a perspective view of a first portion of a locking-mechanism attached to the cart of FIG. 1 or FIG. 19.
Figure 21:
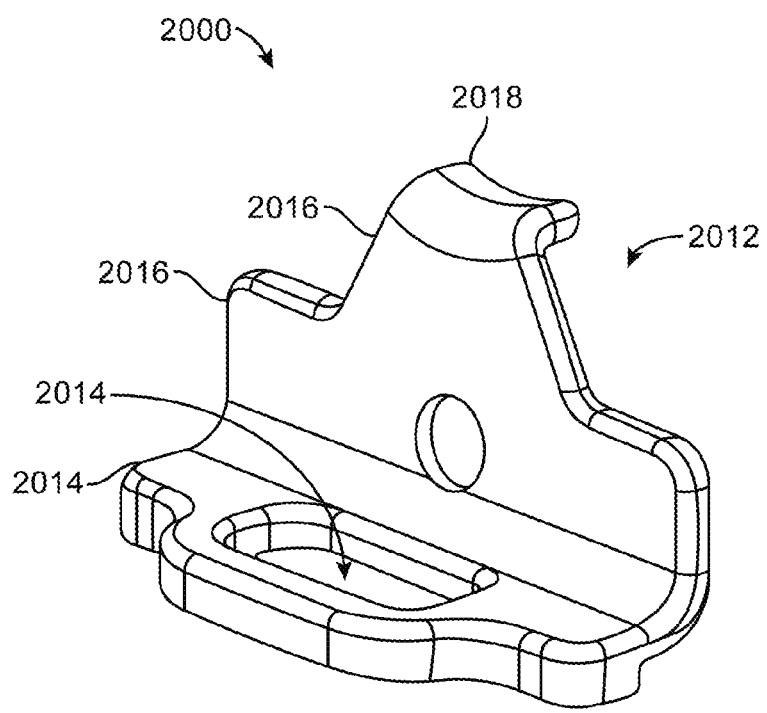
FIG. 21 shows a perspective view of a first portion of a locking-mechanism in isolation.
Figure 22:
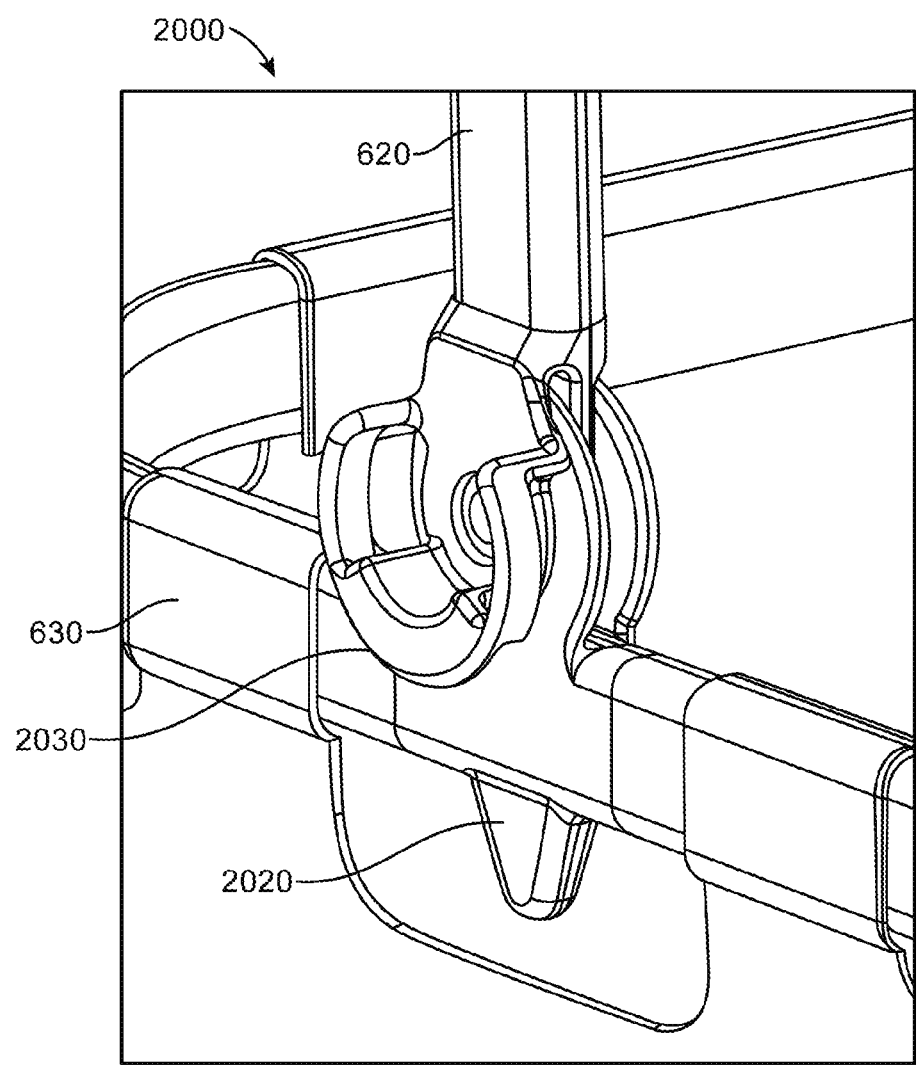
FIG. 22 shows a perspective view of a second portion of a locking-mechanism attached to a basket.

An alternate locking-mechanism 2000 is optionally provided. The components of the alternate locking-mechanism 2000 are shown in FIGS. 20, 21, and 22. FIG. 20 shows a perspective view of a first portion of the locking-mechanism 2000 attached to the cart 100 or 100A. FIG. 21 shows a perspective view of a first portion of the locking-mechanism 2000 in isolation. FIG. 22 shows a perspective view of a second portion of the locking-mechanism 2000 attached to the basket 600.

The locking-mechanism 2000 can be used as an alternative to the locking-mechanism 300 previously described, or in conjunction therewith. The locking-mechanism 2000 includes a latch 2012, and a receptacle 2026 to receive the latch 2012.

The latch 2012 includes three portions, a first portion 2014 and a second portion 2018 both substantially parallel to the shelf-support 120, and a third portion 2016 substantially perpendicular to the shelf-support 120. The third portion 2016 is secured to the arms 130, for example by a screw and nut combination or by other securing means.

The second and third portions 2018 and 2016 are received by an aperture (not shown) in the receptacle 2026 when the receptacle 2026 is in the open position. The receptacle 2026 is rotatably secured to both the end of the handle 620 and the upper-frame 630 of the basket 600. Rotating the handle 620 results in the receptacle 2026 being rotated. When the handle 620 is perpendicular to the upper-frame 630 the receptacle 2026 is in the open position, and when the handle 620 is parallel to the upper-frame 630 the receptacle 2026 is in the closed position. When in the closed position, the basket 600 is locked using the locking-mechanism 2000.

To lock the basket 600, the aperture in the receptacle 2026 is shaped to receive the second portion 2018 when in the open position, but when in the closed position the receptacle 2026 is shaped to lock the second portion 2018. The locking is due to the shape of the aperture in the receptacle. The center of the aperture has a width greater than the width of the second portion 2018. The edges of the aperture have a width than is narrower than the width of the second portion 2018. When in the open position the second portion 2018 and the center of the aperture are aligned; thereby the aperture is configured to receive the second portion 2018. When in the closed position the second portion 2018 and the center of the aperture are misaligned; thereby securing the second portion 2018 in a locked state.

An additional and optional feature, which may be used in conjunction with the locking mechanism 2000 is shown in FIGS. 21 and 22. The basket includes a triangular guide 2020 attached to the handle upper-frame 630 of the basket. The triangular guide is triangular shaped, and has a downwardly extending vertex. The triangular guide helps a user to align the basket 600 for locking with the locking mechanism 2000. The latch 2012 includes an aperture 2014 (best shown in FIG. 21) configured to receive the triangular guide 2020. The aperture 2014 is wider than the vertex of the triangular guide 2020 extending downwardly, such that it is easy for the aperture to receive the guide 2020. When the guide 2020 is received, the basket 600 is aligned such that the latch 2012 and the receptacle 2026 are aligned with one another.

In one embodiment, upper-level basket-retainer 110 is of a different design. It is apparent that a person of ordinary skill in the art may adapt the cart 100 to use a design similar to the middle- and lower-level basket-retainers 112, and 114 for the upper-level basket-retainer 110. Additionally, it is also apparent that a person of ordinary skill in the art may adapt the cart 100 to use a design similar to the upper-level basket-retainer 110 for the middle- and lower-level basket-retainers 112, and 114. The upper-level basket-retainer 110 secures, irremovably, the basket 600 to arms 130, by pivotally coupling the upper-frame 630 of the basket 600 to the arms 130, for example by use of a pivot-hinge or other coupling means.

Each shelf-support 120, 122, and 124 and each basket-retainer 110, 112, and 114 is pivotally coupled to opposing left- and right-arms 130 from a first side and to a second arm 130 from a second side opposite the first side, as shown in FIGS. 1 and 9. The arms 130 are thus positioned on left and right sides of the longitudinal-axis of the shelf-supports and basket-retainers. The arms 130 may be made up of extruded aluminum, which is then drilled and tapped in a secondary process.

In one embodiment, as shown in FIGS. 1 and 9, the shelf-supports and the basket-retainers are interlaced with one another along the length of the longitudinal-axis of the arms 130. The basket-retainers 110, 112, and 114 are arranged along the longitudinal-axis of the arms 130 such that that each basket-retainer 110, 112, and 114 is positioned directly above one of the shelf-supports 120, 122 and 124; as the basket-retainer receives the basket 600 but provides no support for the base of the basket 600. Since each basket 600 contains collapsible sidewalls 610, and a flexible base; each shelf-support 120, 122 and 124 provides added support to the base of one basket 600. Accordingly, as shown best in FIGS. 1 and 9, at one end of the arms 130 is positioned a upper-level basket-retainer 110, followed by (in the following order) an upper-level shelf-support 120, a middle-level basket-retainer 112, a middle-level shelf-support 122, a lower-level basket-retainer 114 and a lower-level shelf-support 124, where the lower-level shelf-support 124 is positioned at the opposing end of the arms 130 relative to the upper-level basket-retainer 110. To enable the cart 100 to fold, each shelf-support 120, 122, and 124 and each basket-retainer 110, 112, and 114 is pivotally coupled, for example by a pivot-hinge or other coupling means, to the arms 130; thereby allowing the shelf-supports and basket-retainers to pivot about a pivot-point when a force is applied thereto.

Figure 10:
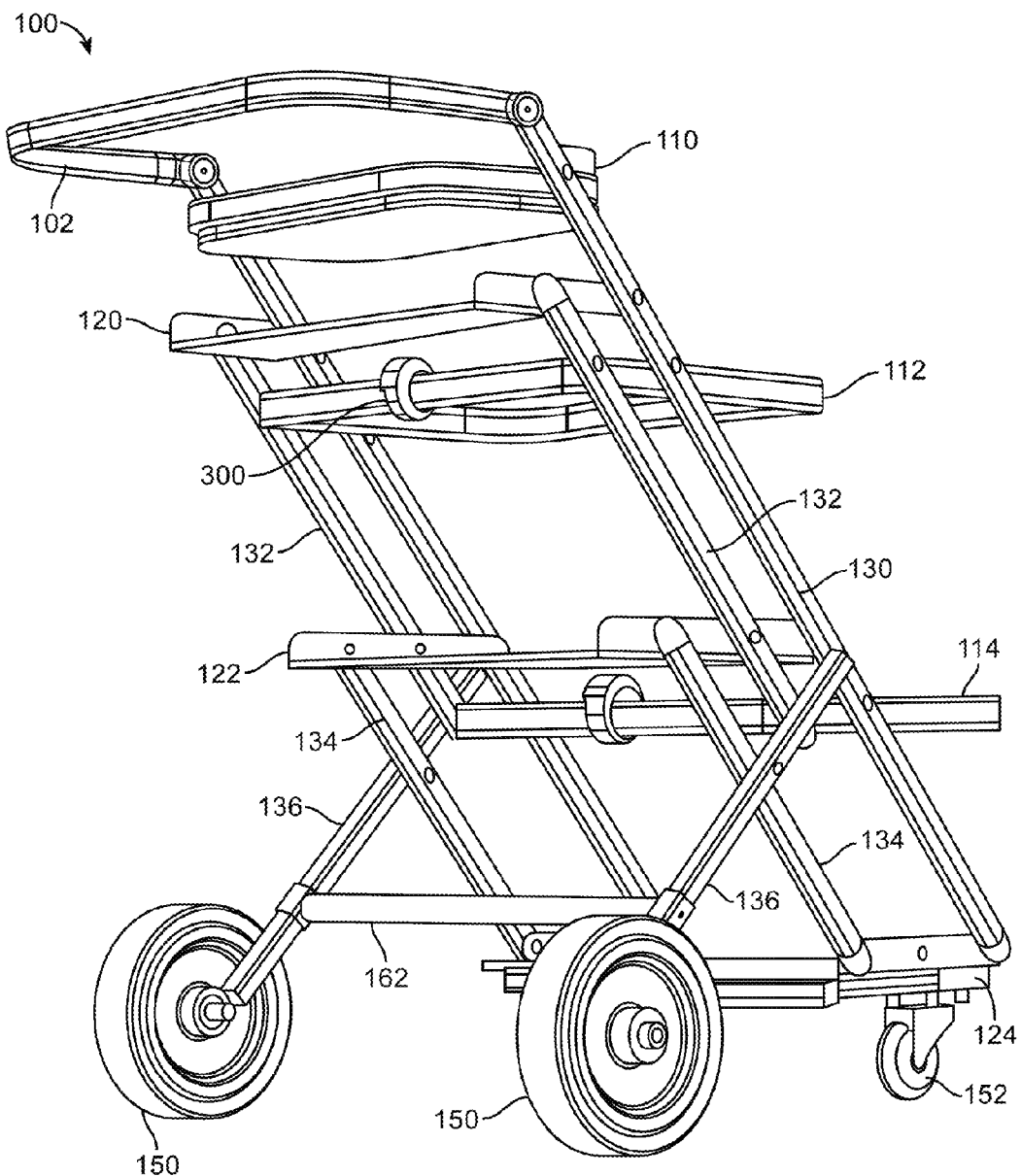
FIG. 10 shows a rear perspective view of the cart of FIG. 1.

In some embodiments, as best shown in FIGS. 1, 9 and 10, the arms 130 are arranged such that when the cart 100 is in an assembled, non-folded open configuration, the arms 130 are parallel to one another and at a 30 to 60 degree angle relative to the shelf-supports 120, 122, and 124 and/or the floor or ground. For example, in one embodiment, the arms 130 are at a 45 degree angle relative to the shelf-support 124. In an assembled, non-folded configuration, the shelf-supports 120, 122, and 124 are arranged to be horizontal; i.e. substantially parallel to the floor or ground. Accordingly, the angled arms 130 cause the shelf-supports 120, 122, and 124 and basket-retainers 110, 112, and 114 to recede relative to one another; thus allowing for easy access to the contents of the baskets 600, when the baskets are installed in the cart 100.

In some embodiments (not shown), the arms 130 are arranged parallel to one another and perpendicularly to the shelf-supports 120, 122, and 124. Accordingly, the shelf-supports 120, 122, and 124 and basket-retainers 110, 112, and 114 are stalked on-top of one another; thus allowing the cart 100 to occupy a smaller footprint.

Figure 2:
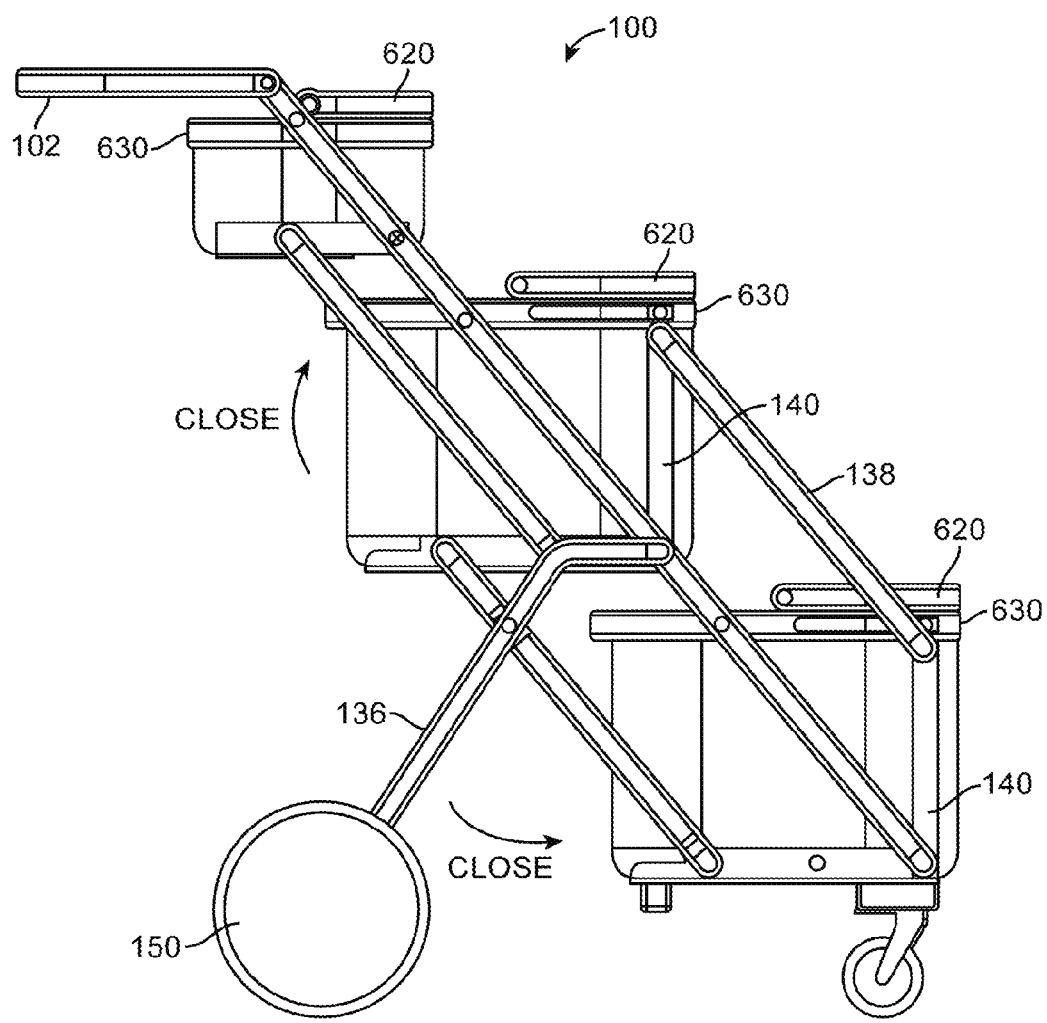
FIG. 2 shows a side profile view of the cart of FIG. 1 with baskets secured on the cart.
Figure 3:
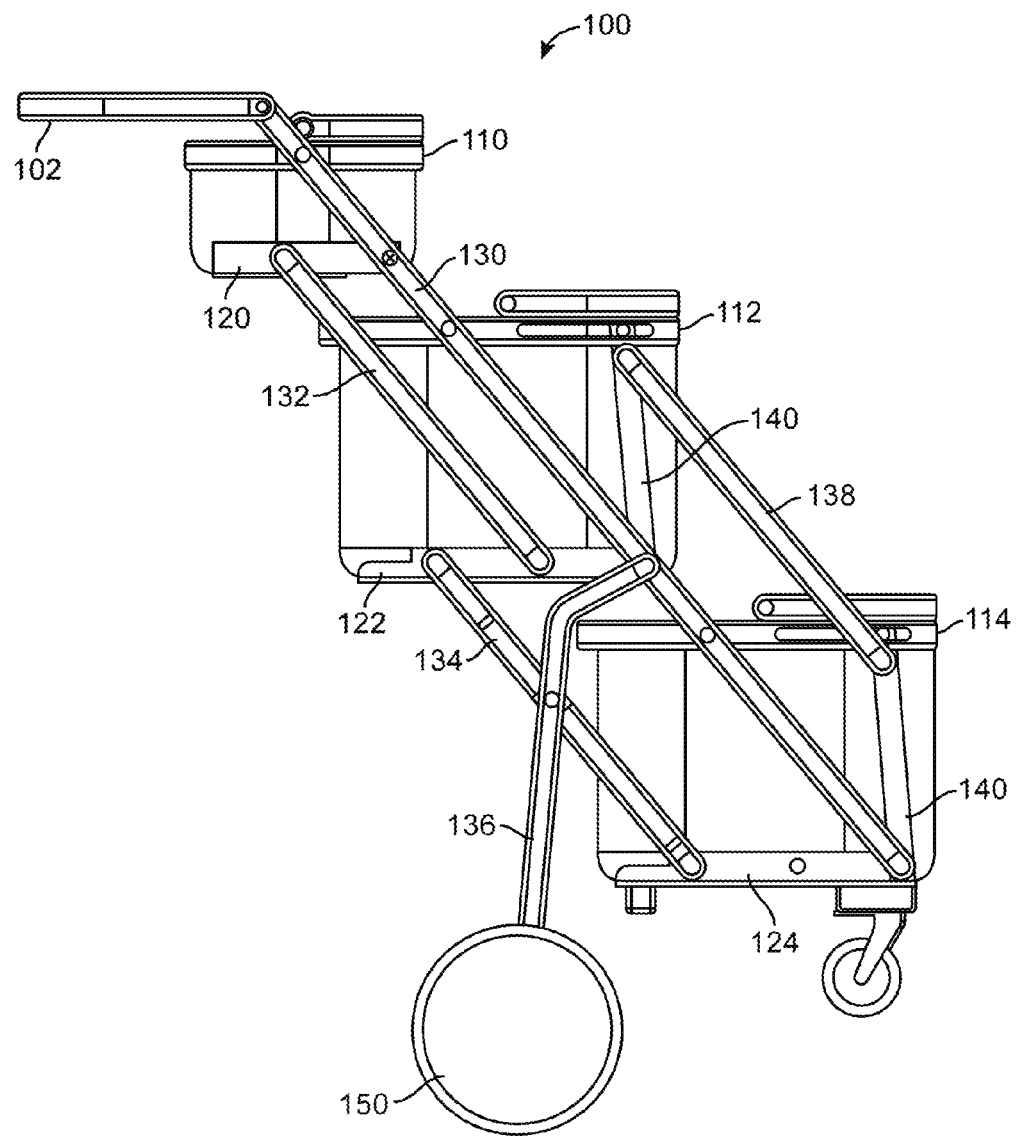
FIG. 3 shows a side profile view of the cart of FIG. 2 in a partially folded state.
Figure 4:
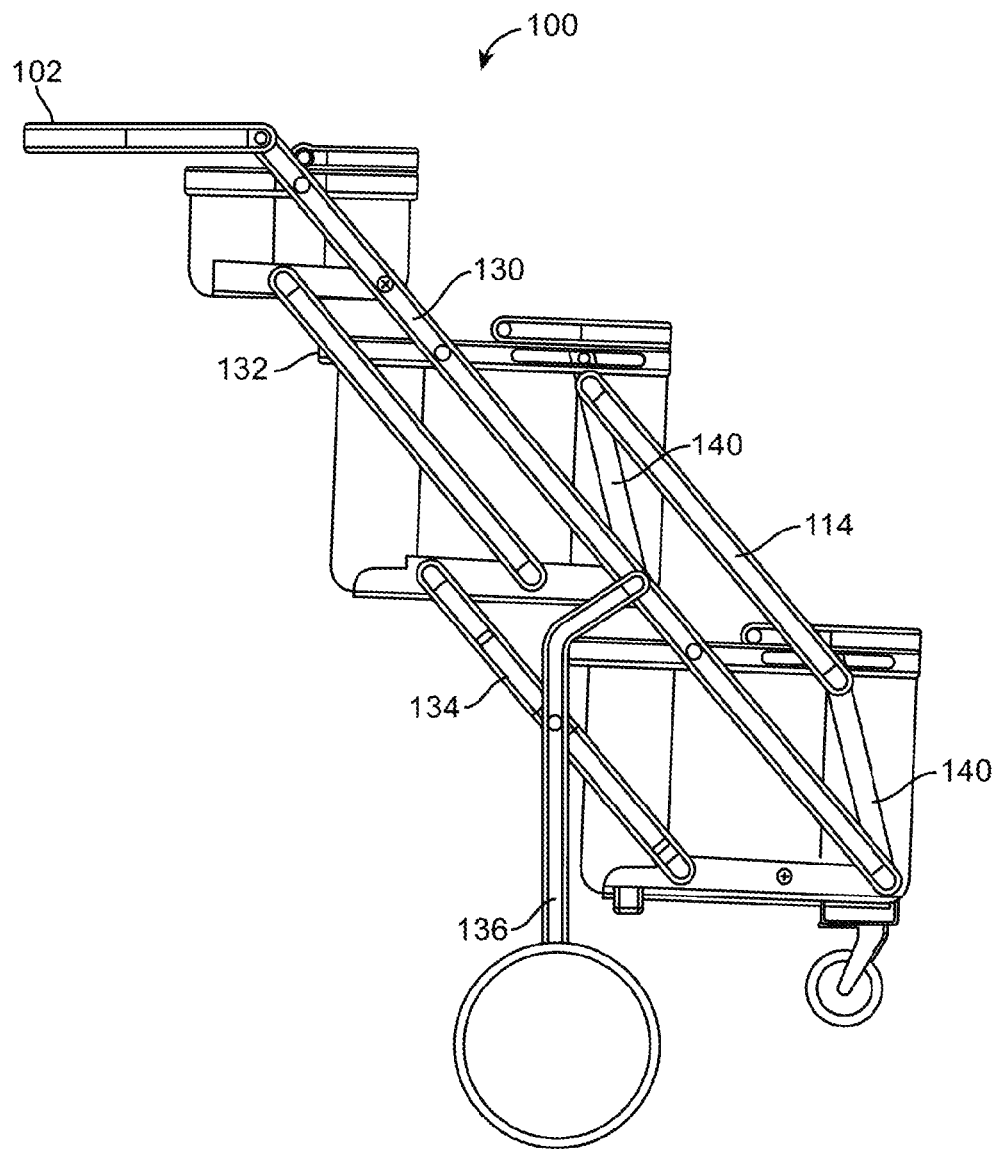
FIG. 4 shows a side profile view of the cart of FIG. 2 in a partially folded state.
Figure 5:
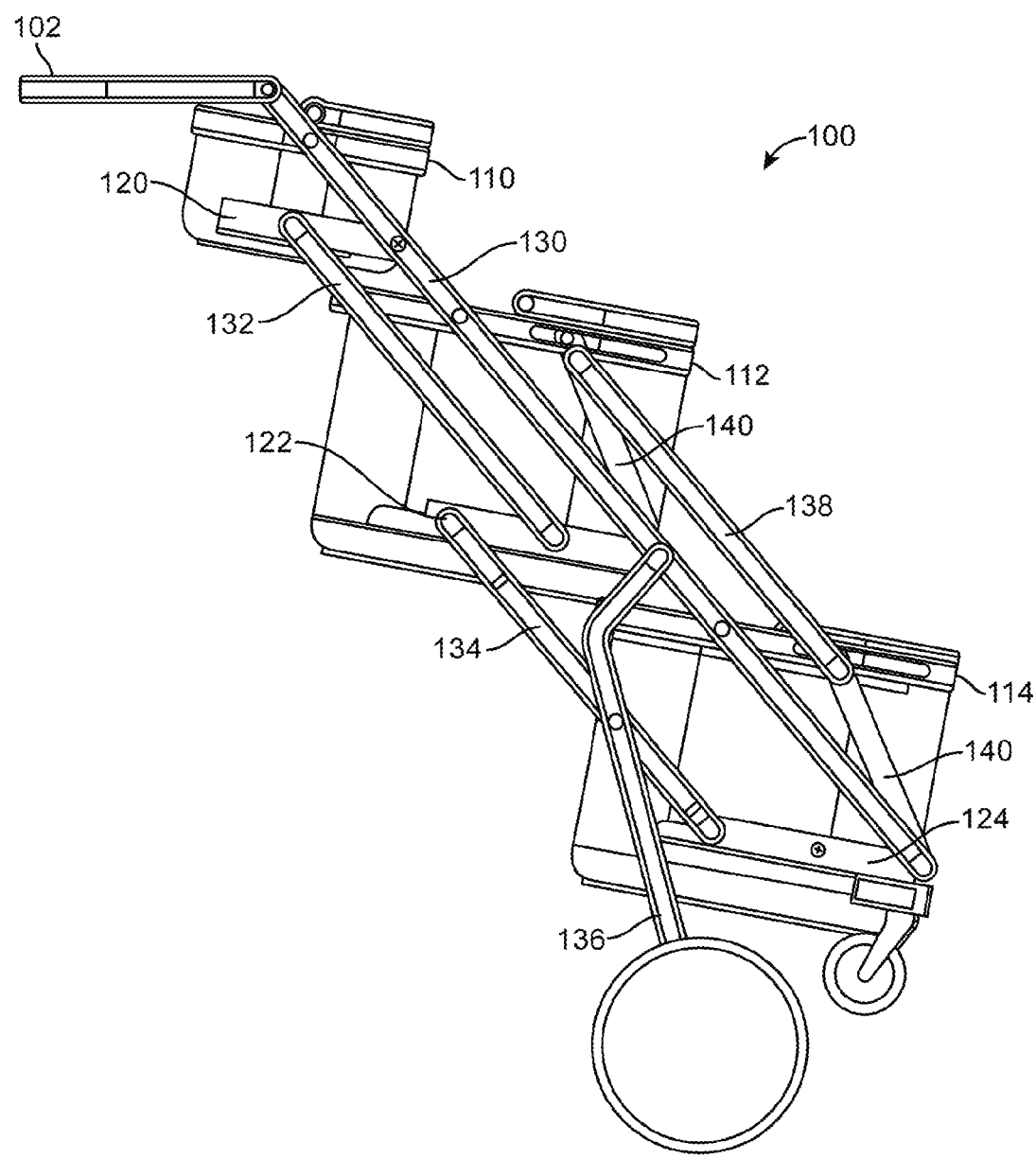
FIG. 5 shows a side profile view of the cart of FIG. 2 in a partially folded state.
Figure 6:
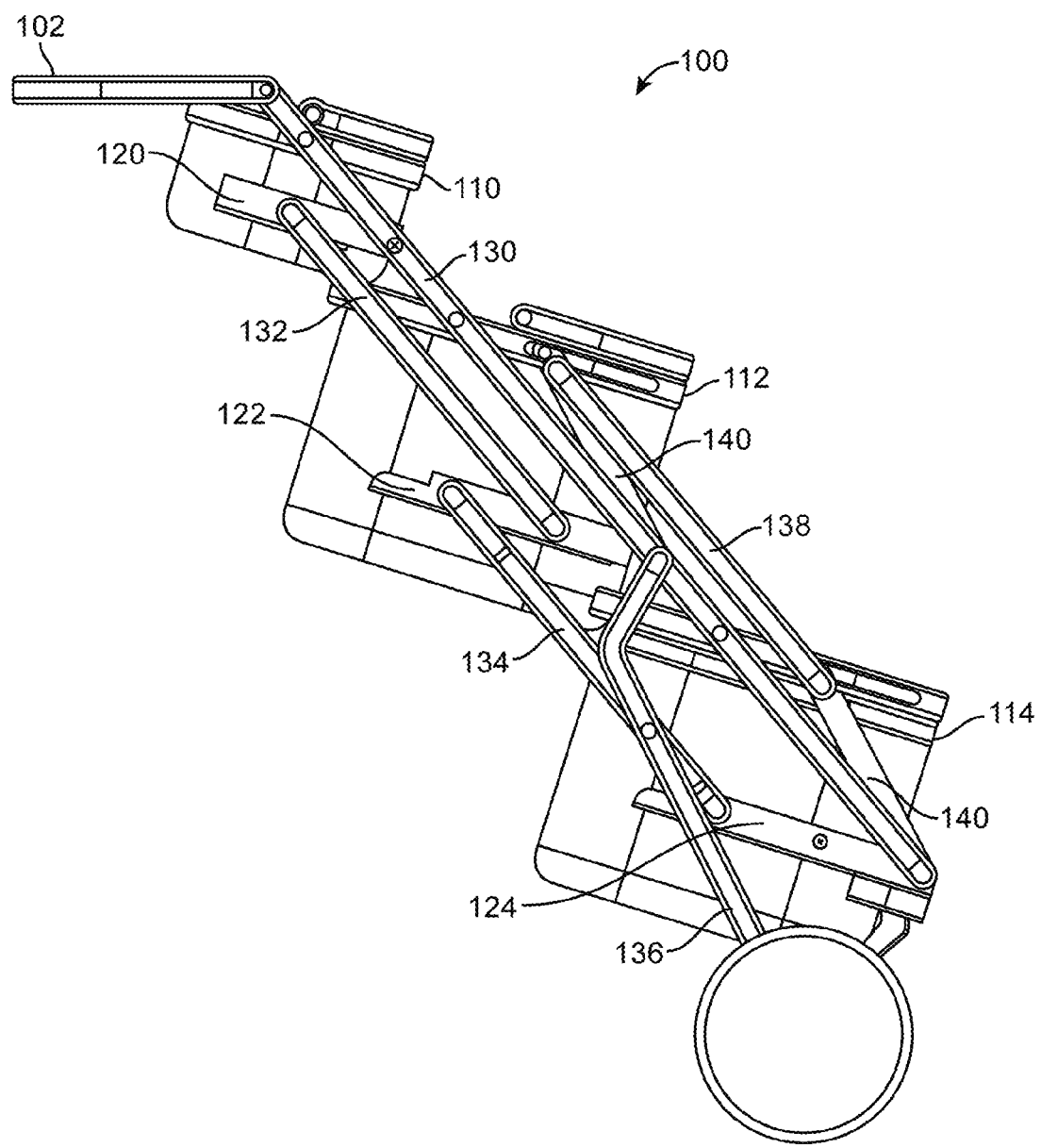
FIG. 6 shows a side profile view of the cart of FIG. 2 in a partially folded state.
Figure 7:
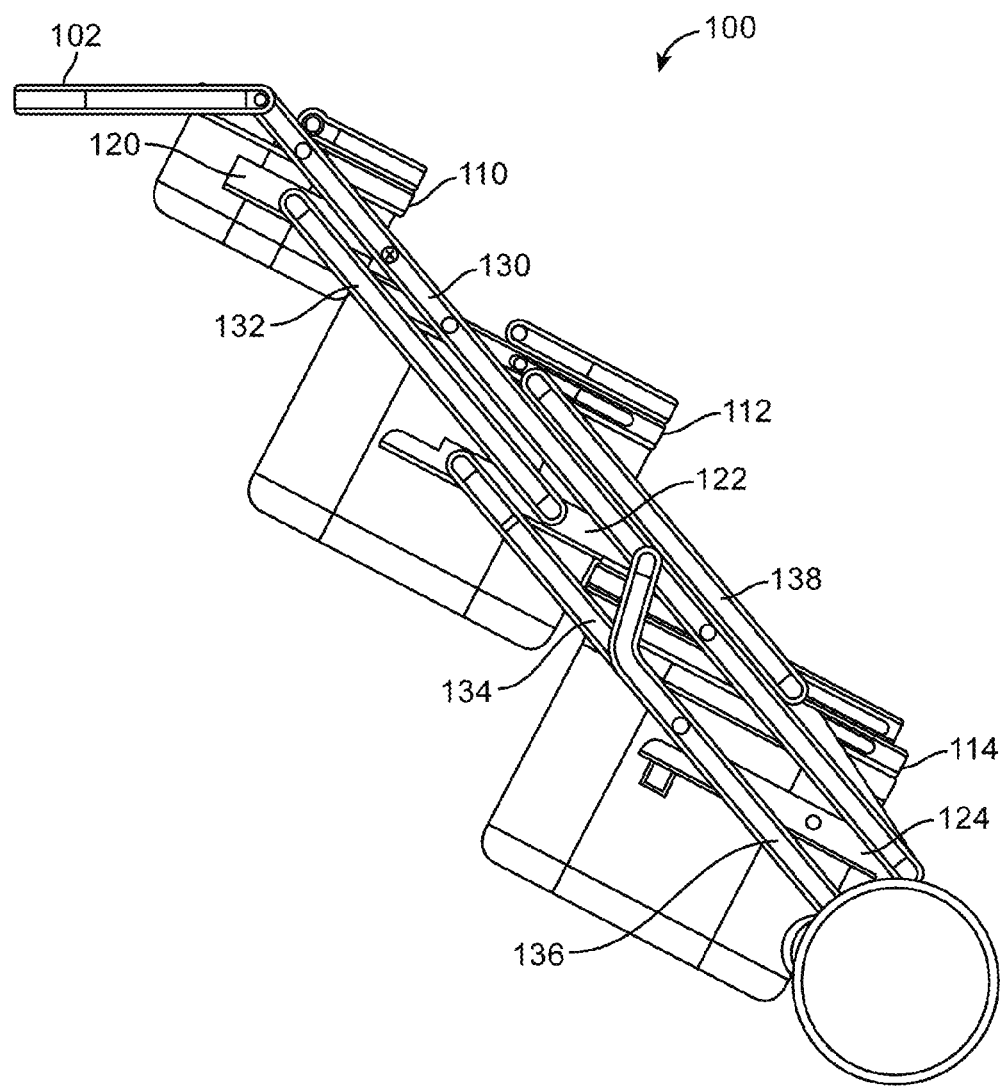
FIG. 7 shows a side profile view of the cart of FIG. 2 in a partially folded state.
Figure 8:
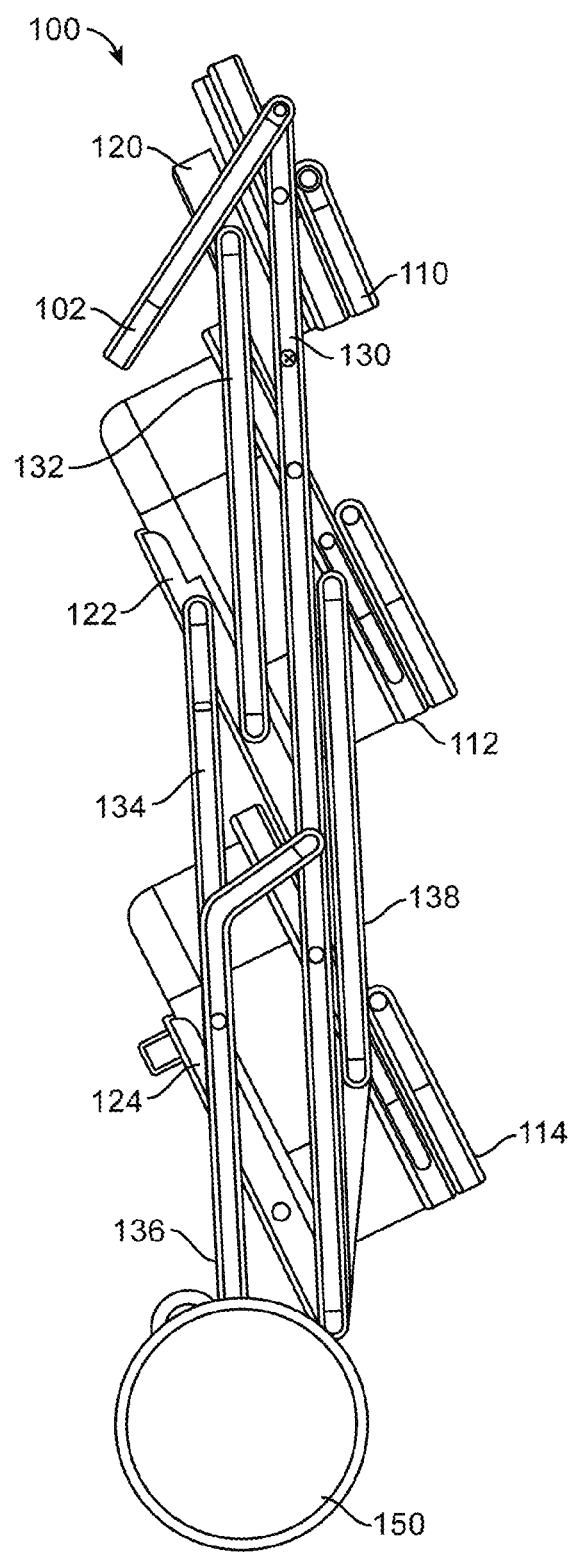
FIG. 8 shows a side profile view of the cart of FIG. 2 in a completely folded state.

In some embodiments, as best shown in FIGS. 1, 9 and 10, a strut, such as struts 132 and 134, is used to couple two of the support-shelves with one another to provide a more stable cart 100. In some embodiments, the struts 132 and 134 are positioned substantially parallel to the arms 130. Additionally, left- and right-struts may be used on opposing sides of the longitudinal-axis of support-shelves to provide better balance to the cart 100. Upper right- and left-struts 132 are pivotally coupled to the upper-level shelf-support 120 and to the middle-level shelf-support 122. Additionally, the upper right- and left-struts 132 are also pivotally coupled to the middle-level basket-retainer 112 and to the lower-level basket-retainer 114. Lower right- and left-struts 134 are pivotally coupled to the middle-level shelf-support 122 and to the lower-level shelf-support 124. As will be appreciated, the arrangement and coupling of the struts 132 and 134 aids in collapsing the cart 100. Additional optional struts may also be used, as shown in FIG. 2, left- and right-struts 138 are pivotally coupled to the perpendicular-arms 140, the perpendicular-arms 140 being perpendicular to the ground and support-shelves. Struts 132, 134 and 138 may be made up of extruded aluminum, which is then drilled and tapped in a secondary process.

Substantially perpendicular to the arms 130 and struts 132 and 134 opposing left- and right-legs 136 are pivotally coupled to the lower left- and right-struts 134 and arms 130. The legs 136 may be made up of one elongate-straight rod as shown in FIGS. 1, 9 and 10. In other embodiments, the legs 136 are made up of first and second elongate-portions, the second portion being at approximately a 135 degree angle from the first portion, as shown in FIG. 2. Other arrangements may be possible. The legs allow the cart 100 to balance, and each leg 136 typically has a wheel 150 mounted at a ground or floor facing end thereof to allow the cart 100 to be pushed or pulled along. Additionally, a cross-strut 152 may be secured perpendicularly to both legs 150 for better stability. The legs 136 and cross-strut 152 may be made up of extruded aluminum, which is then drilled and tapped in a secondary process.

Figure 11:
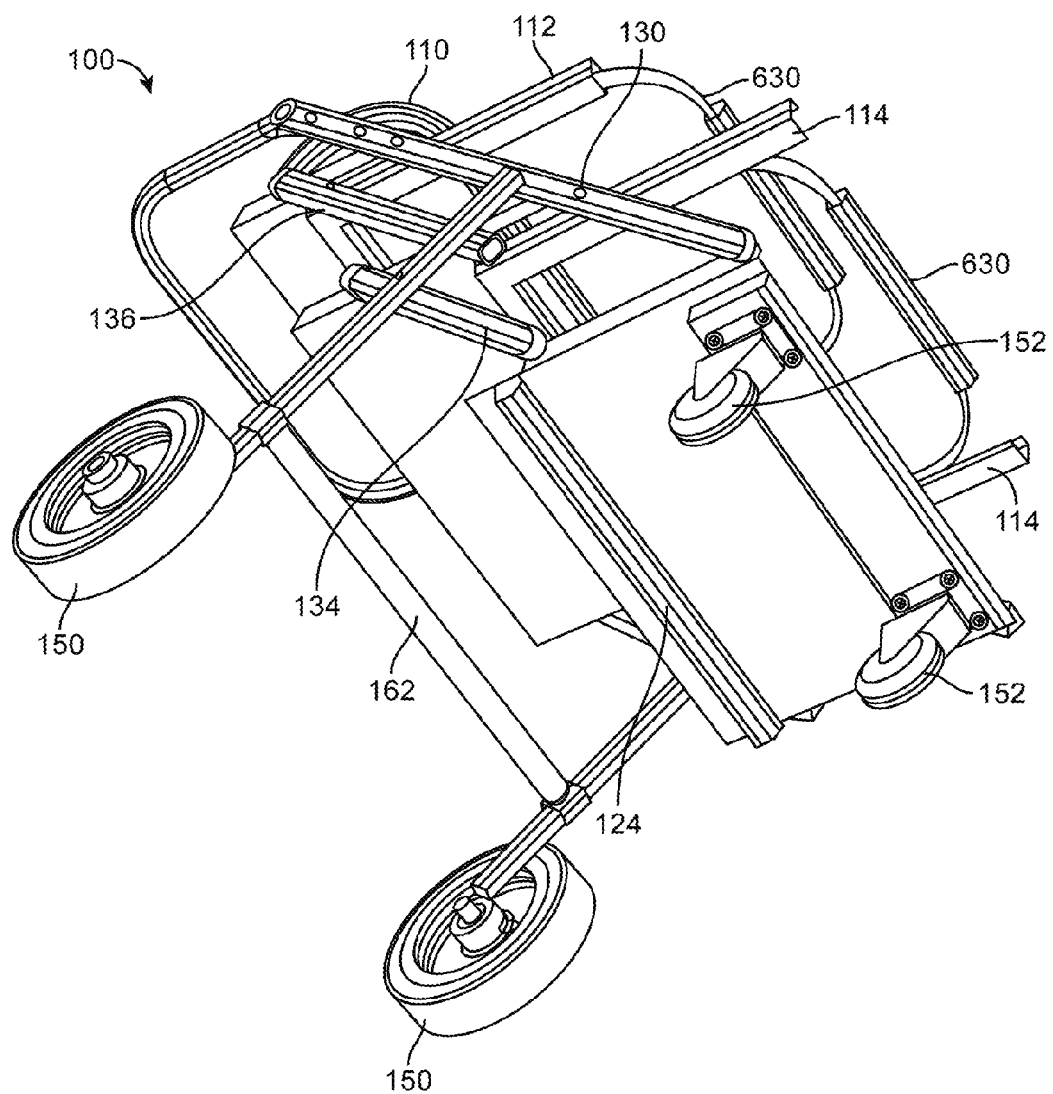
FIG. 11 shows a bottom perspective view of the cart of FIG. 1.

For improved balance when pushing or pulling the cart 100, a pair of casters 152 may optionally be provided at a side of the cart 100 opposing the side of the wheels 150; thus, the cart 100 may be pushed or pulled while on four wheels. The casters 152 in some embodiments are mounted at opposite ends along the longitudinal-axis of a side of the bottom of the lower-level shelf-support 124. The casters typically are rotatable about a pivot; thus allowing for the cart 100 to be steered while being pushed or pulled on four wheels. This is best shown in FIGS. 1, 10 and 11. Alternatively, the casters 152 may be replaced with a pair of legs (not shown); thus the cart 100 may be pushed or pulled at an angle using only the two wheels 150. This arrangement may not be as convenient when moving the cart; however, the cart 100 is more stable when it is left resting on the legs, which may be more desirable in some cases.

Figure 12:
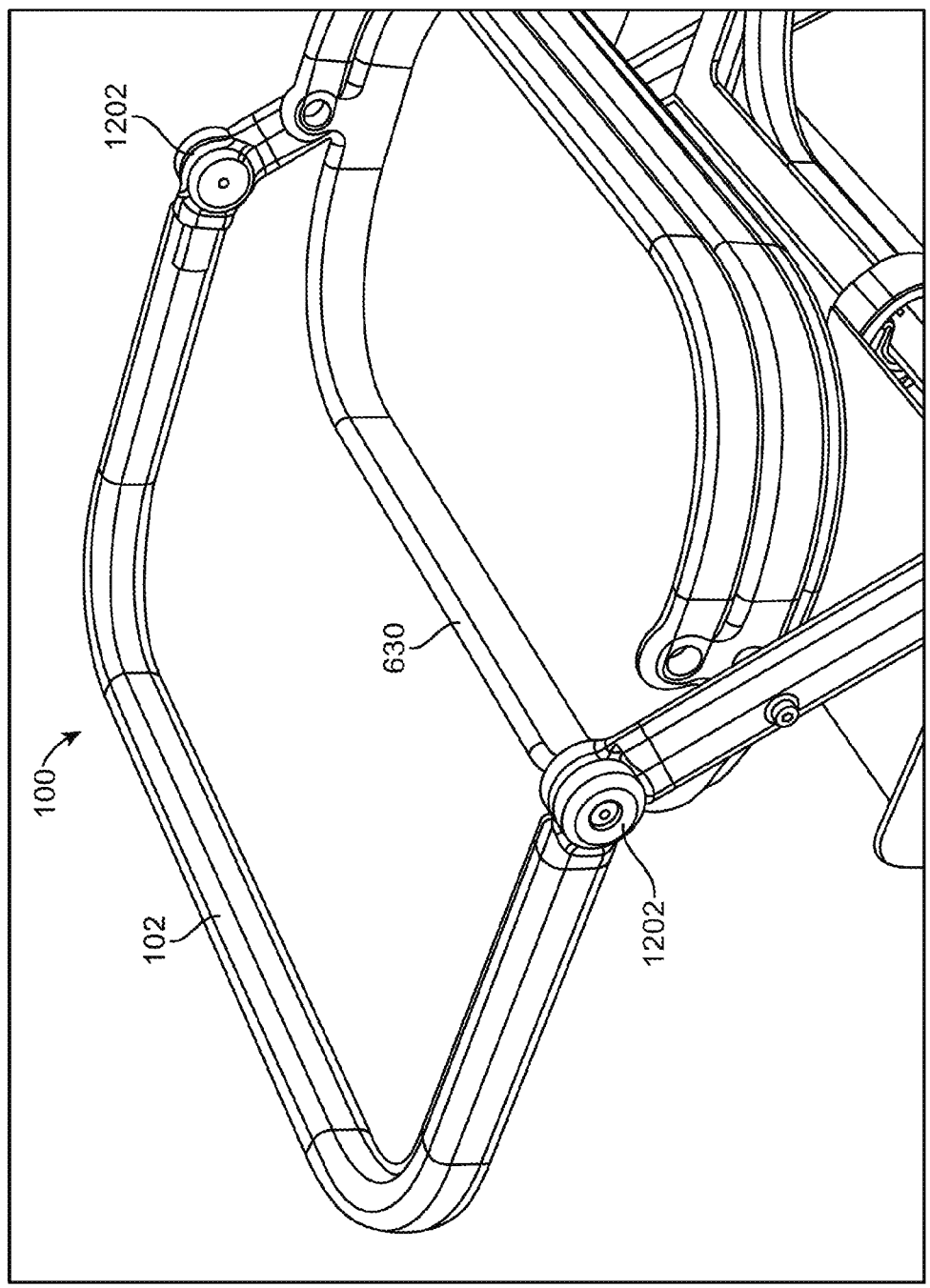
FIG. 12 shows a top perspective view of an example handle for use with the cart of FIG. 1.

A handle 102 is typically provided in the cart 100, to allow for easer maneuverability and handling of the cart 100. The handle 102 is best shown in FIGS. 1, 9, 10 and 12. In some embodiments, the handle 102 is an elongate rod pivotally coupled to an upper-end of both the first and second arms 130. The handle 102 may in some embodiments be made up of three portions, a first portion pivotally coupled to the first arm 130 and extending along the plane of the first arm 130, a second portion secured to the first portion at a substantially perpendicular angle thus providing a user interface, and a third portion secured to the second portion at a substantially perpendicular angle thus meeting and pivotally coupled to the second arm 130; thereby extending along the plane of the second arm. In some embodiments, the handle 102 is an articulating handle that is adjustable in length. The pivot point 1202 shown in FIG. 12 allows the handle to be rotated between an outward-position (as shown in FIG. 12), extending outwardly from the cart 100, and an inward-position (not shown), extending inwardly from the cart 100. While both the inward- and outward-positions are substantially parallel to the floor when the cart 100 is in an assembled, non-folded configuration, the two positions allow the user more flexibility. For example, the outward-position may be more suited for pushing the cart 100, whereas the inward-position may be more suited for pulling the cart 100. The handle 102 may be made up of extruded aluminum, which is then drilled and tapped in a secondary process.

Reference is now made to FIGS. 3 to 8, illustrating a side profile view of an example cart 100 in various stages during the folding process for folding the cart 100. FIG. 2 illustrates a side profile view of the example cart 100 in an assembled, non-folded configuration. To initiate the folding of the cart, a user moves the legs 136 inwardly towards the basket-retainers and the shelf-supports. Since the legs 136 are pivotally coupled to the lower-struts 134, the force of moving the legs 136 also moves the lower-struts 134 inwardly. As the lower-struts 134 are pivotally coupled to the middle- and lower-level support-shelves 122 and 124, and the middle-level support-shelf 122 is coupled to the upper-level support shelf 120 by the upper-struts 130, all the support-shelves 120, 122, and 124 are moved by the force. Since each of the support-shelves 120, 122, and 124 is coupled to the arms 130 and the arms 130 to the basket-retainers 110, 112 and 114; the entire structure moves due to the force of moving the legs 136 inwardly. The support-shelves 120, 122, 124 and the basket-retainers 110, 112, 114 move in a counter-clockwise orientation, whereas the legs 136 move in a clockwise orientation; thereby causing the struts 132, 134, and 138 to move closer to the arms 130 (FIGS. 7 and 8) until the arms 130, struts 132, 134, 138 and the legs 136 are substantially parallel to one another. The support-shelves 120, 122, 124 and the basket-retainers 110, 112, 114 also move to reduce the angle between them and the arms 130. The collapsible sidewalls 610 of the baskets 600 may collapse to a state similar to that shown in FIG. 18; thereby compressing the baskets 600 to occupy less volume.

When the cart 100 is in the folded configuration, simply moving the legs 136 outwardly and away from the cart 100 causes the cart to fully unfold. By moving the legs 136 outwardly, the lower-strut 134 pivoted; thereby causing the middle- and lower-level shelf-supports 122 and 124 to also pivot due to the pivotal coupling of the legs 136 and the middle- and lower-level shelf-supports 122 and 124. Since the upper-strut 132 is pivotally coupled to both the middle-level shelf-support 122 and the upper-level shelf-support 120, and upper-level shelf-support 120 to the arms 130, both the upper-level shelf-support 120 and the arms 130 also pivot in response to the outwardly movement of the legs 136. The arms 130 are pivotally coupled to the basket-retainers 110, 112 and 114; thus the arms 130 cause the basket-retainers 110, 112 and 114 to pivot also. Accordingly, the entire cart 100 unfolds in response to moving the legs 136 outwardly.

Figure 19:
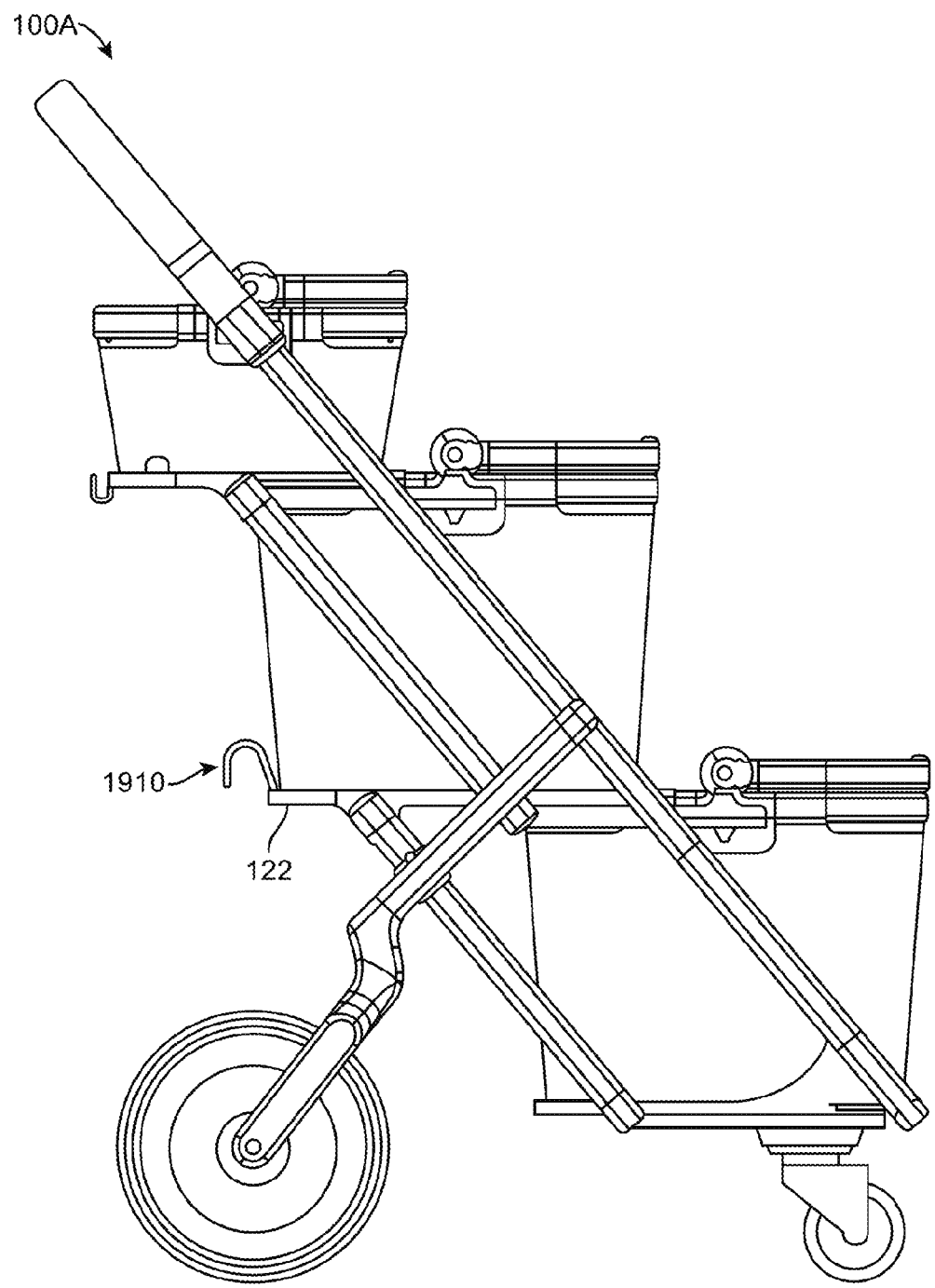
FIG. 19 shows a side profile view of an alternate cart.

An alternate cart 100A is shown in FIG. 19. Cart 100A functions in a manner similar to cart 100. Cart 100A also has an additional handle 1910 attached to the second shelf-support 122. When a user of an unfolded cart 100A applies an upward force on the handle 1910, the cart 100A begins to fold in the manner described above. When a user of a folded cart 100A applies a downward force on the handle 1910, the cart 100A begins to unfold in the manner described above. The handle 1910 may be coated with a rubberized material to increase the friction between the handle 1910 a user's hand, thereby enabling the user to apply the force with ease.

Optional accessories may be added to the cart 100, either for use when the cart 100 is in an assembled, non-folded configuration or when the cart is in a folded configuration, or both. One example accessory may be a cover for covering each of the baskets 600 individually, or all the baskets collectively; to protect the baskets and their contents from weather elements such as wind and precipitation in the non-folded configuration. The individual basket covers also help to retain the contents of the basket 600 inside the basket during transportation. Another example accessory for use with the baskets 600 is a removable liner that is applied to the inner-side of the sidewalls 610; thus allowing for more convenient cleaning. Another example accessory for use with the baskets 600 is a removable thermal-liner that is applied to the inner-side of the sidewalls 610; thus providing protections to the contents of the basket 600 from thermal elements such as heat or cold. Another example accessory for use with the cart 100 may be a bag suitable for holding the folded cart 100.

The cart 100 may also include a cover mechanism (not shown) that can be stored inside a compartment (not shown) at the handle 102. The cover mechanism is configured to cover the cart 100 as-needed, for example to protect the cart 100 and the contents from weather conditions. The cover mechanism can be a flexible sheet in one example. In another example, the cover mechanism can include vanes or other articulated members for supporting the flexible sheet. The vanes can be folded into themselves when stored inside the compartment.

Certain adaptations and modifications of the described embodiments can be made. Therefore, the above discussed embodiments are considered to be illustrative and not restrictive.

What is claimed is:

1. A foldable cart for holding a basket, the basket having collapsible sidewalls and an upper-frame secured to and surrounding an upper-rim of the collapsible sidewalls, the foldable cart comprising:
   a first arm and an opposing parallel second arm which are bias angled with respect to upright when the foldable cart is in an open configuration;
   a shelf-support pivotally coupled at opposing sides to the first and second arms for supporting a bottom of the basket;
   a basket-retainer for removably receiving the upper-frame of the basket above the shelf-support, the basket-retainer pivotally coupled at opposing sides to the first and second arms;
   a respective leg operably coupled to each of the first and second arms; and
   a respective wheel mounted to each leg,
   wherein the foldable cart is foldable to a closed configuration with the basket attached,
   wherein the upper-frame of the basket is securable to the basket-retainer by a releasable locking-mechanism,
   wherein the basket is movable between first and second positions along the basket-retainer when the locking-mechanism is released.

2. The foldable cart of claim 1, wherein the upper-frame of the basket has a rounded-rectangular shape.

3. The foldable cart of claim 1, wherein the releasable locking-mechanism is a cam latch.

4. The foldable cart of claim 1, wherein the basket slides between the first and second positions along the basket-retainer when the locking-mechanism is released.

5. The foldable cart of claim 1, wherein the basket is removable from the cart when moved beyond the second position.

6. The foldable cart of claim 1, wherein the shelf-support is rotatable about a pivot point.

7. The foldable cart of claim 1, further comprising a cart handle positioned at an end of the first and second arms, wherein the shelf-support is positioned at the end of the first and second arms opposite the cart handle, the cart further comprising first and second casters each mounted at a side of the bottom of the shelf-support, the sides being opposite one another.

8. The foldable cart of claim 1, further comprising a cart handle coupled to an upper-end of both the first and second arms.

9. A foldable cart for holding a plurality of baskets, each basket having collapsible sidewalls and an upper-frame secured to and surrounding an upper rim of the collapsible sidewalls, the foldable cart comprising:
   a first arm and an opposing parallel second arm which are bias angled with respect to upright when the foldable cart is in an open configuration;
   a plurality of shelf-supports each pivotally coupled at opposing sides to the first and second arms for supporting a bottom of one of the baskets;
   a plurality of basket-retainers each for removably receiving the upper-frame of one of the baskets, each basket-retainer pivotally coupled at opposing sides to the first and second arms;
   a cart handle coupled to an upper-end of both the first and second arms;
   a respective leg operably coupled to each of the first and second arms;
   a respective wheel mounted to each leg; and
   first and second struts each pivotally coupled to a side of one of the plurality of shelf-supports, the sides being opposite one another,
   wherein the first strut is substantially parallel to the first arm and the second strut is substantially parallel to the second arm,
   wherein the foldable cart is foldable to a closed configuration with the baskets attached.

10. The foldable cart of claim 9, wherein each of the first and second struts is pivotally coupled to one of the legs.

11. The foldable cart of claim 10, further comprising a cross-strut secured to both legs.

12. The foldable cart of claim 11, wherein the arms and struts are pivotally coupled to the support-shelves at a 30 to 60 degree angle and wherein the legs are substantially perpendicular to the arms.

13. The foldable cart of claim 12, wherein each of the plurality of shelf-supports recedes relative to one another.

14. The foldable cart of claim 12, wherein moving the legs towards the support shelf causes the support-shelves to pivot about a pivot point in the arms, thereby causing the arms and legs to be substantially parallel to one another.

15. The foldable cart of claim 9, wherein the upper-frame of each basket is securable to one of the basket-retainers by a releasable locking mechanism.

16. The foldable cart of claim 15, wherein the releasable locking mechanism comprises a latch and a receptacle having an aperture, the aperture configured to receive the latch when the locking mechanism is in an open position, and further configured to lock the latch when the locking mechanism is in a closed position.

17. The foldable cart of claim 16, wherein each basket further comprises a basket handle, the basket handle having an end rotatably secured to the receptacle and configured to rotate the locking mechanism when rotated.

18. A foldable cart for holding a basket, the basket having collapsible sidewalls and an upper-frame secured to and surrounding an upper-rim of the collapsible sidewalls, the foldable cart comprising:
   a first arm and an opposing parallel second arm which are bias angled with respect to upright when the foldable cart is in an open configuration;
   a shelf-support pivotally coupled at opposing sides to the first and second arms for supporting a bottom of the basket;
   a basket-retainer for removably receiving the upper-frame of the basket above the shelf-support, the basket-retainer pivotally coupled at opposing sides to the first and second arms;
   a respective leg operably coupled to each of the first and second arms; and
   a respective wheel mounted to each leg,
   wherein the foldable cart is foldable to a closed configuration with the basket attached,
   wherein the upper-frame of the basket is securable to the basket-retainer by a releasable locking-mechanism,
   wherein the releasable locking-mechanism is a cam latch.

19. A foldable cart for holding a plurality of baskets, each basket having collapsible sidewalls and an upper-frame secured to and surrounding an upper rim of the collapsible sidewalls, the foldable cart comprising:
   a first arm and an opposing parallel second arm which are bias angled with respect to upright when the foldable cart is in an open configuration;
   a plurality of shelf-supports each pivotally coupled at opposing sides to the first and second arms for supporting a bottom of one of the baskets;

a plurality of basket-retainers each for removably receiving the upper-frame of one of the baskets, each basket-retainer pivotally coupled at opposing sides to the first and second arms;

a cart handle coupled to an upper-end of both the first and second arms;

a respective leg operably coupled to each of the first and second arms; and a respective wheel mounted to each leg, wherein the foldable cart is foldable to a closed configuration with the baskets attached, wherein the upper-frame of each basket is securable to one of the basket-retainers by a releasable locking mechanism, wherein the releasable locking mechanism comprises a latch and a receptacle having an aperture, the aperture configured to receive the latch when the locking mechanism is in an open position, and further configured to lock the latch when the locking mechanism is in a closed position.

20. The foldable cart of claim 19, wherein each basket further comprises a basket handle, the basket handle having an end rotatably secured to the receptacle and configured to rotate the locking mechanism when rotated.

* * * * *